(12) United States Patent
Mark

(10) Patent No.: US 10,040,241 B2
(45) Date of Patent: Aug. 7, 2018

(54) SUPPORTS FOR SINTERING ADDITIVELY MANUFACTURED PARTS

(71) Applicant: MARKFORGED, INC., Watertown, MA (US)

(72) Inventor: Gregory Thomas Mark, Brookline, MA (US)

(73) Assignee: MARKFORGED, INC., Watertown, MA (US)

( * ) Notice: Subject to any disclaimer, the term of this patent is extended or adjusted under 35 U.S.C. 154(b) by 0 days.

(21) Appl. No.: 15/892,741

(22) Filed: Feb. 9, 2018

(65) Prior Publication Data

US 2018/0162062 A1    Jun. 14, 2018

Related U.S. Application Data

(63) Continuation of application No. 15/722,445, filed on Oct. 2, 2017.
(Continued)

(51) Int. Cl.
*B29C 64/40* (2017.01)
*B29C 64/141* (2017.01)
(Continued)

(52) U.S. Cl.
CPC .......... *B29C 64/40* (2017.08); *B22F 3/1118* (2013.01); *B29C 31/044* (2013.01);
(Continued)

(58) Field of Classification Search
CPC . B29C 64/10; B29C 64/40; B22H 2003/1046; B22H 7/02
See application file for complete search history.

(56) References Cited

U.S. PATENT DOCUMENTS

| 3,186,957 A | 6/1965 | Stiles |
| 5,011,638 A | 4/1991 | Pinkhasov |

(Continued)

FOREIGN PATENT DOCUMENTS

| CN | 101422963 A | 5/2009 |
| CN | 105408091 A | 3/2016 |

(Continued)

OTHER PUBLICATIONS

Notification of Transmittal of the International Search Report and the Written Opinion of the International Searching Authority from corresponding PCT/US2017/054743 dated Jan. 16, 2018.
(Continued)

*Primary Examiner* — Benjamin A Schiffman
(74) *Attorney, Agent, or Firm* — Lando & Anastasi, LLP

(57) ABSTRACT

A method comprising forming a shrinking platform of layers of a composite, the composite including a metal particulate filler in a first matrix, forming a shrinking support of layers of the composite upon the shrinking platform, forming a first release layer of a release material upon the shrinking support, the release material including a ceramic particulate and a second matrix, and forming a part of the composite upon the shrinking support to form a portable assembly from the combined shrinking platform, shrinking support, release layer and part, wherein substantially horizontal portions of the part are vertically supported by the shrinking platform, wherein the first release layer is configured, after sintering, to separate the part from the shrinking support and to allow the part to be readily removed from the shrinking support, and wherein the shrinking support is configured to prevent the part from distorting during sintering.

30 Claims, 13 Drawing Sheets

Related U.S. Application Data

(60) Provisional application No. 62/545,966, filed on Aug. 15, 2017, provisional application No. 62/519,138, filed on Jun. 13, 2017, provisional application No. 62/505,081, filed on May 11, 2017, provisional application No. 62/489,410, filed on Apr. 24, 2017, provisional application No. 62/480,331, filed on Mar. 31, 2017, provisional application No. 62/442,395, filed on Jan. 4, 2017, provisional application No. 62/430,902, filed on Dec. 6, 2016, provisional application No. 62/429,711, filed on Dec. 2, 2016.

(51) Int. Cl.

| | | |
|---|---|---|
| *B29C 64/295* | (2017.01) | |
| *B29C 64/245* | (2017.01) | |
| *B29C 31/04* | (2006.01) | |
| *B22F 3/11* | (2006.01) | |
| *B33Y 10/00* | (2015.01) | |
| *B29C 64/165* | (2017.01) | |
| *B29K 25/00* | (2006.01) | |
| *B29C 70/16* | (2006.01) | |
| *B29C 64/118* | (2017.01) | |
| *B29C 64/209* | (2017.01) | |
| *B29K 79/00* | (2006.01) | |

(52) U.S. Cl.
CPC .......... *B29C 64/141* (2017.08); *B29C 64/165* (2017.08); *B29C 64/245* (2017.08); *B29C 64/295* (2017.08); *B33Y 10/00* (2014.12); *B29C 64/118* (2017.08); *B29C 64/209* (2017.08); *B29C 70/16* (2013.01); *B29K 2025/08* (2013.01); *B29K 2079/085* (2013.01)

(56) References Cited

U.S. PATENT DOCUMENTS

| | | |
|---|---|---|
| 5,073,526 A | 12/1991 | Enloe et al. |
| 5,182,056 A | 1/1993 | Spence et al. |
| 5,182,170 A | 1/1993 | Marcus et al. |
| 5,198,159 A | 3/1993 | Nakamura et al. |
| 5,198,489 A | 3/1993 | Sterzel et al. |
| 5,204,055 A | 4/1993 | Sachs et al. |
| 5,216,616 A | 6/1993 | Masters |
| 5,242,098 A | 9/1993 | Hardwick |
| 5,257,657 A | 11/1993 | Gore |
| 5,286,573 A | 2/1994 | Prinz et al. |
| 5,288,443 A | 2/1994 | Lee |
| 5,337,961 A | 8/1994 | Brambani et al. |
| 5,387,380 A | 2/1995 | Cima et al. |
| 5,496,682 A | 3/1996 | Quadir et al. |
| 5,503,785 A | 4/1996 | Crump et al. |
| 5,531,958 A | 7/1996 | Krueger |
| 5,555,481 A | 9/1996 | Rock et al. |
| 5,598,200 A | 1/1997 | Gore |
| 5,617,911 A | 4/1997 | Sterett et al. |
| 5,669,433 A | 9/1997 | Sterett et al. |
| 5,697,043 A | 12/1997 | Baskaran et al. |
| 5,738,817 A | 4/1998 | Danforth et al. |
| 5,745,834 A | 4/1998 | Bampton et al. |
| 5,796,207 A | 8/1998 | Safari et al. |
| 5,798,469 A | 8/1998 | Nufer |
| 5,818,149 A | 10/1998 | Safari et al. |
| 5,900,207 A | 5/1999 | Danforth et al. |
| 5,906,863 A | 5/1999 | Lombardi et al. |
| 5,997,795 A | 12/1999 | Danforth et al. |
| 6,004,500 A | 12/1999 | Safari et al. |
| 6,008,281 A | 12/1999 | Yang et al. |
| 6,049,160 A | 4/2000 | Safari et al. |
| 6,193,922 B1 | 2/2001 | Ederer |
| 6,202,734 B1 | 3/2001 | Sackinger et al. |
| 6,344,426 B1 | 2/2002 | Hata et al. |
| 6,352,669 B1 | 3/2002 | Cooper et al. |
| 6,397,922 B1 | 6/2002 | Sachs et al. |
| 6,447,712 B1 | 9/2002 | Dogan et al. |
| 6,558,606 B1 | 5/2003 | Kulkarni et al. |
| 6,589,471 B1 | 7/2003 | Khoshnevis |
| 6,682,684 B1 | 1/2004 | Jamalabad et al. |
| 6,803,003 B2 | 10/2004 | Rigali et al. |
| 6,830,643 B1 | 12/2004 | Hayes |
| 6,884,486 B2 | 4/2005 | Estrin et al. |
| 7,108,827 B1 | 9/2006 | Hata et al. |
| 7,144,548 B2 | 12/2006 | Billiet et al. |
| 7,364,686 B2 | 4/2008 | Kritchman et al. |
| 7,378,052 B2 | 5/2008 | Harryson |
| 7,628,857 B2 | 12/2009 | Kritchman et al. |
| 7,942,987 B2 | 5/2011 | Crump et al. |
| 8,047,251 B2 | 11/2011 | Khoshnevis |
| 8,158,255 B2 | 4/2012 | Yokoyama et al. |
| 8,245,757 B2 | 8/2012 | Crump et al. |
| 8,523,331 B2 | 9/2013 | Houben |
| 8,586,493 B2 | 11/2013 | Kaga et al. |
| 8,721,032 B2 | 5/2014 | Kuznetsov et al. |
| 9,027,378 B2 | 5/2015 | Crump et al. |
| 9,149,988 B2 | 10/2015 | Mark et al. |
| 9,327,448 B2 | 5/2016 | Shah et al. |
| 9,370,896 B2 | 6/2016 | Mark |
| 9,399,323 B1 | 7/2016 | Lu et al. |
| 9,403,725 B2 | 8/2016 | Khoshnevis |
| 9,545,669 B2 | 1/2017 | Klint et al. |
| 9,643,281 B1 | 5/2017 | Memmen et al. |
| 9,815,118 B1 | 11/2017 | Schmitt et al. |
| 9,833,839 B2 | 12/2017 | Gibson et al. |
| 2001/0050448 A1 | 12/2001 | Kubo et al. |
| 2002/0171177 A1 | 11/2002 | Kritchman et al. |
| 2003/0180636 A1 | 9/2003 | Kanga et al. |
| 2003/0185698 A1 | 10/2003 | Wang et al. |
| 2003/0205573 A1 | 11/2003 | Okumura et al. |
| 2004/0183055 A1 | 9/2004 | Chartier et al. |
| 2004/0187714 A1 | 9/2004 | Napadensky et al. |
| 2004/0239009 A1 | 12/2004 | Collins et al. |
| 2005/0058837 A1 | 3/2005 | Farnworth et al. |
| 2005/0249627 A1 | 11/2005 | Wang et al. |
| 2008/0039312 A1 | 2/2008 | Natsuhara et al. |
| 2008/0206561 A1 | 8/2008 | Yokoyama et al. |
| 2008/0211124 A1 | 9/2008 | Zagagi et al. |
| 2008/0248277 A1 | 10/2008 | Yokoyama et al. |
| 2008/0277841 A1 | 11/2008 | Natsuhara et al. |
| 2009/0039570 A1 | 2/2009 | Clark |
| 2009/0148813 A1 | 6/2009 | Sun et al. |
| 2010/0028645 A1 | 2/2010 | Maguire et al. |
| 2010/0193998 A1 | 8/2010 | Crump et al. |
| 2010/0294571 A1 | 11/2010 | Belnap et al. |
| 2011/0176277 A1 | 7/2011 | Kaga et al. |
| 2011/0176952 A1 | 7/2011 | Kruzhanov et al. |
| 2013/0112366 A1 | 5/2013 | Mottin et al. |
| 2014/0251481 A1 | 9/2014 | Kroll et al. |
| 2014/0271961 A1 | 9/2014 | Khoshnevis |
| 2014/0291886 A1 | 10/2014 | Mark et al. |
| 2014/0300017 A1 | 10/2014 | Wighton et al. |
| 2015/0035209 A1 | 2/2015 | Shah et al. |
| 2015/0080495 A1 | 3/2015 | Heikkila |
| 2015/0125334 A1 | 5/2015 | Uetani et al. |
| 2015/0145168 A1 | 5/2015 | Rodgers et al. |
| 2015/0145169 A1 | 5/2015 | Liu et al. |
| 2015/0197862 A1 | 7/2015 | Engel et al. |
| 2015/0202825 A1 | 7/2015 | Cordingley |
| 2015/0239179 A1 | 8/2015 | Goto et al. |
| 2015/0266092 A1 | 9/2015 | Andersson et al. |
| 2015/0273577 A1 | 10/2015 | Vader et al. |
| 2015/0273582 A1 | 10/2015 | Crump et al. |
| 2015/0283298 A1 | 10/2015 | Kaplan et al. |
| 2015/0306664 A1 | 10/2015 | klint et al. |
| 2015/0336219 A1 | 11/2015 | Bruck et al. |
| 2016/0022383 A1 | 1/2016 | Abels et al. |
| 2016/0023373 A1 | 1/2016 | Demuth et al. |
| 2016/0024293 A1 | 1/2016 | Nestle et al. |
| 2016/0039006 A1 | 2/2016 | Amstutz et al. |
| 2016/0052166 A1 | 2/2016 | Hartmann |
| 2016/0075084 A1 | 3/2016 | Sakura |
| 2016/0089720 A1 | 3/2016 | Kamakura et al. |
| 2016/0108483 A1 | 4/2016 | Meyer et al. |

(56) References Cited

U.S. PATENT DOCUMENTS

| | | | |
|---|---|---|---|
| 2016/0229128 | A1 | 8/2016 | Dayagi et al. |
| 2016/0243619 | A1 | 8/2016 | Gothait et al. |
| 2016/0271696 | A1 | 9/2016 | Kamakura |
| 2017/0021452 | A1 | 1/2017 | Tanaka et al. |
| 2017/0028651 | A1 | 2/2017 | Versluys et al. |
| 2017/0129173 | A1 | 5/2017 | Mantell et al. |
| 2017/0173692 | A1 | 6/2017 | Myerberg et al. |
| 2017/0252973 | A1 | 9/2017 | Clark et al. |
| 2017/0312822 | A1 | 11/2017 | Kimblad |
| 2017/0326789 | A1 | 11/2017 | Kimblad et al. |
| 2017/0334140 | A1 | 11/2017 | Andersson et al. |
| 2018/0000138 | A1 | 1/2018 | Kelleher et al. |

FOREIGN PATENT DOCUMENTS

| | | |
|---|---|---|
| DE | 19538257 A1 | 4/1996 |
| DE | 10311446 A1 | 4/2004 |
| DE | 102007033715 A1 | 1/2009 |
| EP | 0479219 A1 | 4/1992 |
| EP | 1400340 A1 | 3/2004 |
| EP | 1486318 A2 | 12/2004 |
| EP | 2359964 A1 | 8/2011 |
| EP | 2857179 A1 | 4/2015 |
| EP | 3117982 A1 | 1/2017 |
| GB | 2532470 A | 5/2016 |
| JP | 2015131479 A | 7/2015 |
| JP | 2016065284 A | 4/2016 |
| KR | 20140069021 A | 6/2014 |
| WO | 2009032228 A2 | 3/2009 |
| WO | 2014152798 A1 | 9/2014 |
| WO | 2014204570 A2 | 12/2014 |
| WO | 2015007966 A1 | 1/2015 |
| WO | 2015056230 A1 | 4/2015 |
| WO | 2015185502 A1 | 12/2015 |
| WO | 2016003275 A1 | 1/2016 |
| WO | 2016004985 A1 | 1/2016 |
| WO | 2016109111 A1 | 7/2016 |
| WO | 20160124432 A1 | 8/2016 |
| WO | 2016139287 A1 | 9/2016 |
| WO | 2018017330 A1 | 1/2018 |

OTHER PUBLICATIONS

"Modules of Furnace," Published on Apr. 6, 2015, https://www.youtube.com/watch?v=zWk48KhQEec.
"Sinterhad Filaments—3D Printing Products for Today's Emerging Industrial Additive Manufacturing Markets," May 5, 2015, https://web.archive.org/web/20150505052938/http://sinterhardfilaments.com:80/.
"Sinterhard Filaments—Introduction," May 6, 2015, https://web.archive.org/web/201505060055339/http://sinterhardfilaments.com:80/?page_id=9.
"Sinterhard," Published on Apr. 6, 2015, https://www.youtube.com/watch?v=wHVP7vPqOGk&t+560s.
Adames, J. M., "Characterization of Polymeric Binders for Metal Injection Molding (MIM) Process," A Dissertation Presidented to The Graduat Faculty of the University of Akron, Dec. 2007, pp. 237.
Agrawal, Dinesh , "Microwave Sintering of Ceramics, Composites, Metals, and Transparent Materials", Journal of Materials Education vol. 19(4.5 & 6), 1997 , 9 Pages.
Burkhardt, Carlo et al., "Fused Filament Fabrication (FFF) of 316L Green Parts for the MIM process", World PM2016-AM-Deposition Technologies 2016 , 7 Pages.
Clemens Lieberwirth, Arne Harder and Hermann Seitz, "Extrusion Based Additive Manufacturing of Metal Parts", Journal of Mechanics Engineering and Automation 7 (2017) 79-83.
Deckers, J. et al., "Additive Manufacturing of Ceramics: A Review", Journal of Cermaic Science and Technology; vol. 5, No. 4, 2014 , pp. 245-260.
Garcia, Javier H., "Development of Binder Systems Based on CAB for Power Injection Moulding (PIM) and Micro Power Injection Moulding (u-PIM) of Zircon and Invar Powers", Jan. 27, 2013, 34 Pages.

Griffith, Michelle L. et al., "Freeform Fabrication of Ceramics via Stereolithography", J.Am. Ceram. Soc., 79 [10] 2601-608, Mar. 1996 , 8 pages.
Hartkop, David , "MiniMetalMaker—3D print with metal clay", https://www.indiegogo.com/projects/minimetalmaker-3d-print-with-metal-clay#/2015 , 3 pages.
Haselhuhn, A. et al., "In situ formation of substrate release mechanisms for gas metal arc weld metal 3-d printing", 2015, pp. 50-59.
Hidy, G. "Chapter 1 Introduction", aerosols, an industrial and environmental science, 1984 , 1-16 pages.
ISA, "PCT Application No. PCT/US17/24067 International Search Report and Written Opinion dated Aug. 25, 2017", 23 pages.
Jakus, Adam E. et al., "Metallic Architectures from 3D-Printed Powder-Based Liquid Inks", Adv. Fund. Mater, DOI: 10.1002/adfm.201503921 , 2015 pp. 6985-6995.
Kollenberg, W. 2014. "Ceramics and Multi-Material 3D Printing." Keramische Zeitschrift 4: 233-6 [English Abstract on front of the Patent].
Kovacs, B., "Sinterhard Metal or Ceramic Filled Filaments for 3D Printing—Kickstarter," Apr. 10, 2015 Update, https://www.kickstarter.com/projects/1093108121/sinterhard-metal-filled-filaments-for-3d-printing/post/1194731.
Kovacs, B., "Sinterhard Metal or Ceramic Filled Filaments for 3D Printing—Kickstarter," Apr. 11, 2015 Update, https://www.kickstarter.com/projects/1093108121/sinterhard-metal-filled-filaments-for-3d-printing/post/1196404.
Kovacs, B., "Sinterhard Metal or Ceramic Filled Filaments for 3D Printing—Kickstarter," Apr. 14, 2015 Update, https://www.kickstarter.com/projects/1093108121/sinterhard-metal-filled-filaments-for-3d-printing/post/1198099.
Kovacs, B., "Sinterhard Metal or Ceramic Filled Filaments for 3D Printing—Kickstarter," Apr. 20, 2015 Update, https://www.kickstarter.com/projects/1093108121/sinterhard-metal-filled-filaments-for-3d-printing/post/1200082.
Kovacs, B., "Sinterhard Metal or Ceramic Filled Filaments for 3D Printing—Kickstarter," Apr. 24, 2015 Update, https://www.kickstarter.com/projects/1093108121/sinterhard-metal-filled-filaments-for-3d-printing/post/1209077.
Kovacs, B., "Sinterhard Metal or Ceramic Filled Filaments for 3D Printing—Kickstarter," Apr. 26, 2015 Update, https://www.kickstarter.com/projects/1093108121/sinterhard-metal-filled-filaments-for-3d-printing/post/1210585.
Kovacs, B., "Sinterhard Metal or Ceramic Filled Filaments for 3D Printing—Kickstarter," Apr. 26, 2015, 2nd Update, https://www.kickstarter.com/projects/1093108121/sinterhard-metal-filled-filaments-for-3d-printing/post/1212021.
Kovacs, B., "Sinterhard Metal or Ceramic Filled Filaments for 3D Printing—Kickstarter," Apr. 28, 2015 Update, https://www.kickstarter.com/projects/1093108121/sinterhard-metal-filled-filaments-for-3d-printing/post/1212903.
Kovacs, B., "Sinterhard Metal or Ceramic Filled Filaments for 3D Printing—Kickstarter," Apr. 30, 2015 Update, https://www.kickstarter.com/projects/1093108121/sinterhard-metal-filled-filaments-for-3d-printing/post/1214989.
Kovacs, B., "Sinterhard Metal or Ceramic Filled Filaments for 3D Printing—Kickstarter," Apr. 30, 2015, 2nd Update, https://www.kickstarter.com/projects/1093108121/sinterhard-metal-filled-filaments-for-3d-printing/post/1216618.
Kovacs, B., "Sinterhard Metal or Ceramic Filled Filaments for 3D Printing—Kickstarter," Apr. 9, 2015 Update, https://www.kickstarter.com/projects/1093108121/sinterhard-metal-filled-filaments-for-3d-printing/post/1190938.
Kovacs, B., "Sinterhard Metal or Ceramic Filled Filaments for 3D Printing—Kickstarter," Aug. 17, 2015 Update, https://www.kickstarter.com/projects/1093108121/sinterhard-metal-filled-filaments-for-3d-printing/post/1326705.
Kovacs, B., "Sinterhard Metal or Ceramic Filled Filaments for 3D Printing—Kickstarter," Aug. 29, 2016 Update, https://www.kickstarter.com/projects/1093108121/sinterhard-metal-filled-filaments-for-3d-printing/post/1667406.
Kovacs, B., "Sinterhard Metal or Ceramic Filled Filaments for 3D Printing—Kickstarter," Jan. 6, 2016 Update, https://www.

(56) References Cited

OTHER PUBLICATIONS kickstarter.com/projects/1093108121/sinterhard-metal-filled-filaments-for-3d-printing/post/1459873.
Kovacs, B., "Sinterhard Metal or Ceramic Filled Filaments for 3D Printing—Kickstarter," Jul. 24, 2015 Update, https://www.kickstarter.com/projects/1093108121/sinterhard-metal-filled-filaments-for-3d-printing/post/1304221.
Kovacs, B., "Sinterhard Metal or Ceramic Filled Filaments for 3D Printing—Kickstarter," Jul. 4, 2015 Update, https://www.kickstarter.com/projects/1093108121/sinterhard-metal-filled-filaments-for-3d-printing/post/1259628.
Kovacs, B., "Sinterhard Metal or Ceramic Filled Filaments for 3D Printing—Kickstarter," Jun. 10, 2015 Update, https://www.kickstarter.com/projects/1093108121/sinterhard-metal-filled-filaments-for-3d-printing/post/1259492.
Kovacs, B., "Sinterhard Metal or Ceramic Filled Filaments for 3D Printing—Kickstarter," Oct. 26, 2015 Update, https://www.kickstarter.com/projects/1093108121/sinterhard-metal-filled-filaments-for-3d-printing/posts/1394824.
Kovacs, B., "Sinterhard Metal or Ceramic Filled Filaments for 3D Printing—Kickstarter," Oct. 9, 2015, https://web.archive.org/web/20151009063620/https://www.kickstarter.com/projects/1093108121/sinterhard-metal-filled-filaments-for-3d-printing/description.
Kovacs, B., "Sinterhard Metal or Ceramic Filled Filaments for 3D Printing—Kickstarter," Oct. 9, 2015, Update Summary, https://web.archive.org/web/20151009063620/https://www.kickstarter.com/projects/1093108121/sinterhard-metal-filled-filaments-for-3d-printing/updates.
Krassenstein, Brian, "Mini Metal Maker, Affordable Metal Clay 3D Printer, Relaunches on Indiegogo to Fund Mass Production", https://3dprint.com/48292/mini-metal-maker-3d-print/, 2013 , 6 Pages.
Kukla, Christian et al., "Effect of Particle Size on the Properties of Highly-Filled Polymers for Fused Filament Fabrication", NPL-20 Jul. 2016 , 5 pages.
Kukla, Christian et al., "Properties for PIM Feedstocks Used in Fused Filament Fabrication", World PM2016-AM-Deposition Technologies 2016 , 5 Pages.
Nickels, Liz, "Crowdfunding metallurgy," Metal Power Report, vol. 71, No. 5, Sep./Oct. 2016, Special Feature, pp. 324-327.
Onagoruwa, S., Bose, S., and Bandyopadhyay, A. 2001. "Fused Deposition of Ceramics (FDC) and Composites." In Proc. SFF, 224-31.
Park, Mansoo et al., "Accelerated sintering in phase-separating nanostructured alloys", Nature Communications | 6:6858 | DOI: 10.1038/ncomms7858 |www.nature.com/naturecommunications Apr. 22, 2015 , 6 pages.
Riecker, S. et al., "Fused Deposition Modeling-Opportunities for Cheap Metal AM", World PM2016-AM-Deposition Technologies, 2016 , 6 Pages.
Scheithauer, U., Slawik, T., Schwarzer, E., Richter, H.-J., Moritz, T., and Michaelis, A. 2015. "Additive Manufacturing of Metal-Ceramic-Composites by Thermoplastic 3D-Printing (3DTP)." Journal of Ceramic Science and Technology 6 (2): 125-32.
Shah, Ramille N. et al., "3D-Printing of Energy Devices Using Particle-Based Inks", Northwestern University, Querrey Institute for BioNanotechnology Institute for Sustainability and Energy at Northwestern Aug. 2014 , 5 Pages.
Stanimirovic, Z. et al., "Ceramic Injection Molding, Some Critical Issues for Injection Molding," Published online Mar. 23, 2012, pp. 131-149.
Taylor, Shannon L. et al., "Iron and Nickel Cellular Structures by Sintering of 3D-Printed Oxide or Metallic Particle Inks", Advanced Engineering Materials, DOI: 10.1002/adem.201600365, Sep. 16, 2016 , 8 pages.
Wang, H. et al., "Modifying Polyacetal Binder Based Feedstock to Improve Quality of MIM Parts," Metal Powder Industries Federation, American Powder Metallurgy Institute Internationa, 1997, pp. 18-55.

"3D printed PM filled filaments could replace MIM", Materials Today, Apr. 14, 2015, www.materialstoday.com/metal-procesing/news/3d-printed-pm-filled-filaments-could-replace-mim/.
"AMUG: XJet Presenting NanoParticle Jetting Metal 3D Printing Process to Large Crowd", 3DPrint.com, Apr. 6, 2016, https://3dprint.com/128448/amug-xjet-metal-3d-printer/.
"Caution Advised on 3D Printed Metal Proposal", The Molding Blog, Apr. 14, 2015, http://www.themoldingblog.com/2015/04/14/proceed-with-caution-on-3d-printed-metal-parts/.
"ColorFabb beta tests new PLA Bronze & BambooFill filament for 3D printers", 3ders.org, May 12, 2014, http://www.3ders.org/articles/20140512-colorfabb-beta-testing-new-pla-bronze-bambootill-filament-for-3d-printers.html.
"ExOne:Digital Part Materialization/Industrial 3D Printing", YouTube, https://www.youtube.com/channel/UC2AGWEWI1iF0mCeggzUNNA [retrieved from the Internet on Jun. 6, 2018].
"Filament lets you 3D print pure metal objects with your desktop 3D printer", 3ders.org, Jun. 30, 2016, http:// www.3ders.org//articles/20160630-filamet-lets-you-3d-print-pure-metal-objects-with-your-desktop-3d-printerhtml.
"Matterfab's 3D Metal Printer", YouTube, published on Jul. 18, 2014, https://www.youtube.com/watch?v=wRXymDoYoWQ.
"PM and MIM—Touching Your Life, Part 1", YouTube, published on Mar. 22, 2013, https://www.youtube.com/watch?v=0o_PiLlk0w0.
"PM and MIM—Touching Your Life, Part 2", YouTube, published on Mar. 22, 2013, https://www.youtube.com/watch?v=shA65PATHxs.
"Ricoh makes metal injection molding obsolete with new highly efficient metal 3D printer", 3ders.org, Jun. 24, 2016, hittp://www.3ders.orgiarticles/20160624-ricoh-makes-metal-injection-molding-obsolete-with-new-highly-efficient-metal-3d-printer.html.
"Ricoh's new method metal 3D printer, coating material particles with resin in advance", MONOist, 2016, http://monoist.atmarkitco.jp/mn/articles/1606/24/news057.html#l_sp_160624dms_ricoh_02.jpg.
"XJet Demos Metal Jet 3D Printing Live at RAPID 2016", Engineering.com, May 24, 2016, https://www.engineering.com/3DPrinting/3DPrintingArticles/ArticleID/12207D(Jet-Demos-Metal-Jet-3D-Printing-Live-at-RAPID-2016.aspx.
"Xjet to develop world's first direct 3D metal jetting system for custom metal manufacturing", 3ders.org, Nov. 10, 2015, http://www.3ders.org/articles/20151109-xjet-to-develop-worlds-first-direct-3d-metal-printing-jetting-system.html.
Agarwala et al., "Fused Deposition of Ceramics and Metals: An Overview", Center for Ceramic Research, Rutgers University; AlliedSignal Research and Technology, 1996, pp. 385-389.
Hiller, J., "Digital Materials: Voxel Design, RAPID Assembly, Structural Properties, and Design Methods", A Dissertation Prestented to the Faculty of the Graduate School of Cornell University, 2011.
Ponche et al., "A new global approach to design for additive manufacturing", Virtual and Physical Prototyping, Taylor & Francis, 2012 7 (2), pp. 93-105.
Wu et al., "Solid freeform fabrication of metal components using fused deposition of metals", Materials and Design, 23 (2002), pp. 97-105.
"How can I avoid YSZ green ceramic material from sticking to the crucible during sintering?", ResearchGate, https://www.researchgate.net/post/How_can_1_avoid_YSZ_green_ceramic_material_from_sticking_to_the_crucible_during_sintering [retrieved from the Internet on Jun. 1, 2018].
"Metal Injection Molding Turns the Volume Up, and Down", Photo Labs, Inc., 2014 (4 pages).
"Separator Powder Sheets", C12 Advanced Technologies, LLC, hffp://www.c12materials.com/separatorpowdersheets.html [retrieved from the Internet on Jun. 4, 2018].
"Setter-Plates / Kiln Furniture" Data Sheet, Kerafol, Jul. 20, 2017.
"Two-material/two-color powder metal injection molding", Metal Injection Molding Handbook, a vol. in Woodhead Publishing Series in Metals and Surface Engineering, 2012, Chapter 14, p. 343.

(56) References Cited

OTHER PUBLICATIONS

"XJet Website", XJet, Mar. 2016, htttps://webarchive.org/web/20160307151914/http://www.xjet3d.com/technology.
Agarwala, M. et al., "Structural quality of parts processed by fused deposition", Rapid Prototyping Journal, vol. 2, No. 1, 1996, pp. 4-19.
Agarwala, M.K., "Fused Deposition of Ceramics (FDC) for Structural Silicon Nitride Components", Center for Ceramic Research and Dept. of Mechanical Engineering, Rutgers—The State University; AlliedSignal Inc., 1996, pp. 335-344.
Asiabanpour, B. et al., "Advancements in the SIS process", Texas State University, University of Southern California, Aug. 13, 2003, pp. 25-38.
Attia, U. et al., "A review of micro-powder injection moulding as a microfabrication technique", Journal of Micromechanics and Microengineering, 21, (2011) 043001, 22 pages.
Clancy, R. et al., "Fused Deposition of Ceramics: Progress Towards a Robust and Controlled Process for Commercialization", AlliedSignal, Inc. Research and Technology, 2008, pp. 185-194.
Haselhuhn, A. et al., "Substrate Release Mechanisms for Gas Metal Arc Weld 3-D Aluminum Metal Printing", 3D Printing & Additive Manufacturing, 1(4), 2014, pp. 204-209.
Hildreth, O. et al., "Dissolvable Metal Supports for 3D Direct Metal Printing", 3D Printing and Additive Manufacturing, vol. 3, No. 2, 2016, pp. 91-97.
Jafari, M.A. et al., "A novel system for fused deposition of advanced multiple ceramics", Rapid Prototyping Journal, vol. 6, No. 3, 2000, pp. 161-174.
Khoshnevis, B. et al., "SIS—A New SFF Method Based on Powder Sintering", University of Southern California, 2003, pp. 440-447.
Kollenberg, W., "Keramik and Multi-Material 3D-Druck", Keramische Zeitschrift, Apr. 2014, pp. 233-236.
Kumar, S. et al., "Composites by rapid prototyping technology", Materials and Design 31, 2010, pp. 850-856.
Lieberwirth, C. et al., "Extrusion Based Additive Manufacturing of Metal Parts", Journal of Mechanics Engineering and Automation 7, 2017, pp. 79-83.
Lombardi, J. et al., "Issues Associated with EFF & FDM Ceramic Filled Feedstock Formulation", Advanced Ceramics Research, Inc.; University of Arizona, Arizona Materials Laboratories, 1997, pp. 457-464.
Martens, T. et al., "Direct Sinter Bonding of Metal Injection-Molded Parts to Solid Substrate Through Use of Deformable Surface Microfeatures", Journal of Micro and Nano-Manufacturing, Mar. 2013, vol. 1 (9 pages).
McMains S. et al, "Rapid Prototyping of Solid—Three Dimensional Parts", Computer Science Division, Department of Electrical Engineering and Computer Science, 1995, 61 pages.
McNulty, T. et al., "Development of a Binder Formulation for Fused Deposition of Ceramics", Rutgers University, Department of Ceramic and Materials Engineering, 1998, pp. 613-620, https://sffsymposium.engr.utexas.edu/Manuscripts/1998/1998-70-McNulty.pdf.
Michaels, S., "Production of Metal Parts Using the Three Dimensional Printing Process", Massachusetts Institute of Technology, Department of Mechanical Engineering, 1993 (88 pages).
Molitch-Hou, Michael, XJet Releases New Metal and Ceramic 3D Printers, Engineering.com, Nov. 11, 2017, https://www.engineering.com/3DPrinting/3DPrintingArticles/ArticleID/15986/XJet-Releases-New-Metal-and-Ceramic-3D-Printers.aspx.
Nishiyabu, K, "Powder space holder metal injection molding (PSH-MIM) of micro-porous metals", Woodhead Publishing Limited, 2012, pp. 349-390.
O'Neal, Bridget, "Aluminum & Steel 3D Printer Filaments on Their Way—Sinterhard Launces Kickstarter Campaign", Apr. 7, 2015, https://3dprint.com/56373/sinterhard-kickstarter/.
Peterson, K. et al., "Macro-Meso-Microsystems Integration in LTCC: LDRD Report", Sandia Report, Sandia National Laboratories, Mar. 2007 (90 pages).
Peterson, K.A. et al., "Novel Microsystem Applications with New Techniques in Low-Temperature Co-Fired Ceramics", International Journal of Applied Ceramic Technology, vol. 2, No. 5, 2005, pp. 345-363.
Petros, M., "The Extension of Selective Inhibition Sintering (SIS) to High Temperature Alloys", A Dissertation Presented to the Faculty of the USC Graduate School, University of Southern California, Aug. 2016 (121 pages).
Seluga, K., "Three Dimensional Printing by Vector Printing of Fine Metal Powders", Massachusetts Institute of Technology, Department of Mechanical Engineering, Aug. 2001, pp. 1-96.
Stanimirovic, Z. et al., "Ceramic Injection Molding, Some Critical Issues for Injection Molding", Dr. Jian Wang (Ed.), ISBN: 978-953-51/0297-7, InTech (2012), pp. 131-148, Available from: http://www.intechopen.com/books/some-critical-issues-for-injection-molding/ceramic-injection-molding.
Tay, B.Y. et al., "Solid freeform fabrication of ceramics", International Materials Reviews, vol. 48, No. 6, 2003, pp. 341-370.
Wang, H. et al., "Modifying Polyacetal Binder Based Feedstock to Improve Quality of MIM Parts", Materials Technology Laboratory, CANMET, Department of Natural Resources Canada, 1987, pp. 18-45 to 18-55.
Williams, C., "Design and Development of a Layer-Based Additive Manufacturing Process for the Realization of Metal Parts of Designed Mesostructure", Georgia Institute of Technology, Apr. 2008 (422 pages).
Yoo, H., "Reactive Binders for Metal Parts Produced by Three Dimensional Printing", Massachusetts Institute of Technology, Department of Mechanical Engineering, May 1997, pp. 1-106.
Zaleski, Andrew, "Why 3D-Printing Companies Should be Watching This Startup", Dec. 1, 2015, http://fortune.com/2015/12/01/3d-printing-metals-xjet/.
Zhang, J. et al., "Selective Separation Sintering (SSS) a New Layer Based Additive Manufacturing Approach for Metals and Ceramics", University of Southern California, Department of Industrial and Systems Engineering, 2015, pp. 71-79.

SUPPORTS FOR SINTERING ADDITIVELY MANUFACTURED PARTS

CROSS-REFERENCE TO RELATED APPLICATIONS

This application is a continuation of U.S. patent application Ser. No. 15/722,445, filed Oct. 2, 2017, entitled "SUPPORTS FOR SINTERING ADDITIVELY MANUFACTURED PARTS", herein incorporated by reference in its entirety. U.S. patent application Ser. No. 15/722,445 claims the benefit under 35 U.S.C. § 119(e) of U.S. provisional application Ser. No. 62/429,711, filed Dec. 2, 2016, entitled "SUPPORTS FOR SINTERING ADDITIVELY MANUFACTURED PARTS"; 62/430,902, filed Dec. 6, 2016, entitled "WARM SPOOL FEEDING FOR SINTERING ADDITIVELY MANUFACTURED PARTS"; 62/442,395 filed Jan. 4, 2017, entitled "INTEGRATED DEPOSITION AND DEBINDING OF ADDITIVE LAYERS OF SINTER-READY PARTS"; 62/480,331 filed Mar. 31, 2017, entitled "SINTERING ADDITIVELY MANUFACTURED PARTS IN A FLUIDIZED BED"; 62/489,410 filed Apr. 24, 2017, entitled "SINTERING ADDITIVELY MANUFACTURED PARTS IN MICROWAVE OVEN"; 62/505,081 filed May 11, 2017, entitled "RAPID DEBINDING VIA INTERNAL FLUID CHANNELS"; 62/519,138 filed Jun. 13, 2017, entitled "COMPENSATING FOR BINDER-INTERNAL STRESSES IN SINTERABLE 3D PRINTED PARTS"; and 62/545,966 filed Aug. 15, 2017, entitled "BUBBLE REMEDIATION IN 3D PRINTING OF METAL POWDER IN SOLUBLE BINDER FEEDSTOCK", the disclosures of which are herein incorporated by reference in their entireties.

FIELD

Aspects relate to three dimensional printing of composite metal or ceramic materials.

BACKGROUND

"Three dimensional printing" as an art includes various methods for producing metal parts.

In 3D printing, in general, unsupported spans as well as overhanging or cantilevered portions of a part may require removable and/or soluble and/or dispersing supports underneath to provide a facing surface for deposition or to resist deformation during post-processing.

SUMMARY

According to a first aspect of the embodiments of the present invention, a method of reducing distortion in an additively manufactured part includes forming a shrinking platform of successive layers of composite, the composite including a metal particulate filler in a debindable matrix. The debindable matrix may include different components so as to be a one or two stage binder. Shrinking supports are formed of the same composite above the shrinking platform. A desired part of the same composite is formed upon the shrinking platform and shrinking supports, substantially horizontal portions (e.g., overhangs, bridges, large radius arches) of the desired part being vertically supported by the shrinking platform (e.g., directly, via the shrinking supports, or via a release layer). A sliding release layer is formed below the shrinking platform of equal or larger surface area than a bottom of the shrinking platform (e.g., as shown in FIG. 4) that reduces lateral resistance between the shrinking platform and an underlying surface (e.g., such as a build platform or a tray for sintering). The matrix is debound sufficient to form a shape-retaining brown part assembly (e.g., including a sparse lattice of remaining binder to hold the shape) including the shrinking platform, shrinking supports, and desired part. The shape-retaining brown part assembly formed from the same composite is heated to shrink all of the shrinking platform, the shrinking supports, and the desired part together at a same rate as neighboring metal particles throughout the shape-retaining brown part assembly undergo atomic diffusion. According, uniform shrinking and the sliding release layer reduce distortion.

An apparatus of similar advantage may include a print head that deposits the shrinking platform, the shrinking supports, and the desired part, a second printhead that forms the sliding release layer, a debinding wash that debinds the shape-retaining brown part assembly, and a sintering oven to heat and shrink the shrinking platform, the shrinking supports, and the desired part together at a same rate.

Optionally, an open cell structure including interconnections among cell chambers is deposited in at least one of the shrinking platform, the shrinking supports, and the desired part; and a fluid debinder is penetrated into the open cell structure to debind the matrix from within the open cell structure. Additionally, or alternatively, the shrinking platform, shrinking supports, and desired part may be formed to substantially align a centroid of the combined shrinking platform and connected shrinking supports with the centroid of the part. Further additionally or in the alternative, the shrinking supports may be interconnected to a side of the desired part by forming separable attachment protrusions of the same composite between the shrinking supports and the side of the desired part. Still further additionally or in the alternative, a lateral support shell may be formed of the same composite following a lateral contour of the desired part, and the lateral support shell may be connected to the lateral contour of the desired part by forming separable attachment protrusions of the same composite between the lateral support shell and the desired part.

Further optionally, soluble support structures of the debindable matrix may be formed, without the metal particulate filler, that resist downward forces during the forming of the desired part, and the matrix debound sufficient to dissolve the soluble support structures before heating the shape-retaining brown part assembly. Alternatively, or in addition, soluble support structures of a release composite may be formed, the release composite including a ceramic particulate filler and the debindable matrix, the soluble support structures resisting downward forces during the forming of the desired part. Before heating the shape-retaining brown part assembly, the matrix may be debound sufficient to form a shape-retaining brown part assembly including the shrinking platform, shrinking supports, and desired part, and to dissolve the matrix of the soluble support structures.

Additionally, or in the alternative, the underlying surface may include a portable build plate. In this case, the shrinking platform may be formed above the portable build plate, and the sliding release layer formed below the shrinking platform and above the portable build plate with a release composite including a ceramic particulate and the debindable matrix. The shape-retaining brown part assembly may be sintered during the heating. The build plate, sliding release layer, and shape-retaining brown part assembly may be kept together as a unit during the debinding and during the sintering. After sintering, the build plate, sliding release layer, shrinking platform, and shrinking supports may be separated from the desired part.

Optionally, part release layers may be formed between the shrinking supports and the desired part with a release composite including a ceramic particulate filler and the debindable matrix, and the shape-retaining brown part assembly sintered during the heating. The part release layers and shape-retaining brown part assembly may be kept together as a unit during the debinding and during the sintering. After sintering, separating the part release layers, shrinking platform, and shrinking supports may be separated from the desired part. In this case, an open cell structure including interconnections among cell chambers in the shrinking supports may be deposited, and a fluid debinder may be penetrated into the open cell structure to debind the matrix from within the open cell structure.

According to another aspect of the embodiments of the present invention, a method of reducing distortion in an additively manufactured part includes depositing, in successive layers, a shrinking platform formed from a composite, the composite including a metal particulate filler in a debindable matrix, and depositing shrinking supports of the same composite and above the shrinking platform. An open cell structure including interconnections among cell chambers in the shrinking supports is deposited. From the same composite, a desired part is deposited upon the shrinking platform and shrinking supports. The shrinking platform, shrinking supports, and desired part are exposed to a fluid debinder to form a shape-retaining brown part assembly. The fluid debinder is penetrated into the open cell structure to debind the matrix from within the open cell structure. The shape-retaining brown part assembly is sintered to shrink at a rate common throughout the shape-retaining brown part assembly.

Optionally, a sliding release layer is deposited below the shrinking platform of equal or larger surface area than a bottom of the shrinking platform that reduces lateral resistance between the shrinking platform and an underlying surface. Additionally, or in the alternative, part release layers are deposited between the shrinking supports and the desired part with a release composite including a ceramic particulate filler and the debindable matrix, and the part release layers and shape-retaining brown part assembly are kept together as a unit during the exposing and during the sintering. After sintering, the part release layers, shrinking platform, and shrinking supports are separated from the desired part. Further optionally, as shown in, e.g., FIGS. 8-10, vertical gaps without release composite are formed between shrinking supports and the desired part where a vertical surface of a shrinking support opposes an adjacent wall of the desired part.

Alternatively, or in addition, as shown in, e.g., FIGS. 8-10, a lateral support shell block is deposited having a large cell interior, having cells with cell cavities wider than a thickest wall within the lateral support shell block, to assist in diffusing and penetrating debinding fluid into the support. Further alternatively, or in addition, the shrinking supports may be interconnected to a side of the desired part by forming separable attachment protrusions of the same composite between the shrinking supports and the side of the desired part.

Further optionally, as shown in, e.g., FIGS. 8-10, a lateral support shell of the same composite as the shrinking supports may be deposited to follow a lateral contour of the desired part. In this case, the lateral support shell may be connected to the lateral contour of the desired part by forming separable attachment protrusions of the same composite between the lateral support shell and the desired part. Alternatively, or in addition, at least one of the shrinking platform, the lateral support shell and the desired part may be deposited with interconnections between internal chambers, and a fluid debinder may be penetrated via the interconnections into the internal chambers to debind the matrix from within the open cell structure. The shrinking platform, shrinking supports, and desired part may be deposited to substantially align a centroid of the combined shrinking platform and connected shrinking supports with the centroid of the part.

According to another aspect of the embodiments of the present invention, a method of reducing distortion in an additively manufactured part includes depositing, in successive layers, a shrinking platform formed from a composite, the composite including a metal particulate filler in a debindable matrix. Shrinking supports of the same composite may be deposited above the shrinking platform. As shown in, e.g., FIGS. 8-10, among the shrinking supports, parting lines as separation clearances may be formed dividing the shrinking supports into fragments separable along the separation clearances. From the same composite, a desired part may be shaped upon the shrinking platform and shrinking supports. The matrix may be debound sufficient to form a shape-retaining brown part assembly including the shrinking platform, shrinking support columns, and desired part. The shape-retaining brown part assembly may be sintered to shrink at a rate uniform throughout the shape-retaining brown part assembly. The shrinking supports may be separated into fragments along the separation clearances, and the fragments may be separated from the desired part.

Optionally, one or more separation clearances are formed as vertical clearance separating neighboring support columns and extending for substantially an height of the neighboring support columns, and further comprising, and the neighboring support columns are separated from one another along the vertical clearances. Alternatively, or in addition, within a cavity of the desired part, interior shrinking supports are formed from the same composite. Among the interior shrinking supports, parting lines may be formed as separation clearances dividing the interior shrinking supports into subsection fragments separable along the separation clearances. The subsection fragments may be separated from one another along the separation clearances.

Alternatively, or in addition, the fragments are formed as blocks separable from one another along a separation clearance contiguous within a plane intersecting the shrinking supports. A lateral support shell of the same composite as the shrinking supports may be formed to follow a lateral contour of the desired part. Optionally, the lateral support shell may be connected to the lateral contour of the desired part by forming separable attachment protrusions of the same composite between the lateral support shell and the desired part. Further optionally, in the lateral support shell, parting lines may be formed dividing the lateral support shell into shell fragments separable along the parting lines. The matrix may be debound sufficient to form a shape-retaining brown part assembly including the shrinking platform, shrinking support columns, lateral support shell, and desired part. The lateral support shell may be separated into the shell fragments along the parting lines. The shell fragments may be separated from the desired part.

Further optionally, at least one of the shrinking platform, the shrinking supports, and the desired part may be deposited with interconnections between internal chambers, and a fluid debinder penetrated via the interconnections into the internal chambers to debind the matrix from within the open cell structure. Alternatively, or in addition, soluble support structures of the debindable matrix without the metal particulate filler may be formed that resist downward forces during the forming of the desired part, and the matrix debound sufficient to dissolve the soluble support structures before sintering the shape-retaining brown part assembly.

Still further optionally, a sliding release layer may be formed below the shrinking platform of equal or larger surface area than a bottom of the shrinking platform that reduces lateral resistance between the shrinking platform and build plate, and the shrinking platform may be formed above the portable build plate. The sliding release layer may be formed below the shrinking platform and above the portable build plate with a release composite including a ceramic particulate and the debindable matrix, the build plate, sliding release layers and shape-retaining brown part assembly may be kept together as a unit during the debinding and during the sintering.

Further alternatively or in addition, part release layers may be formed between the shrinking supports and the desired part with a release composite including a ceramic particulate filler and the debindable matrix, and the part release layers and shape-retaining brown part assembly may be kept together as a unit during the debinding and during the sintering. After sintering, the part release layers, shrinking platform, and shrinking supports may be separated from the desired part.

At least one aspect in accordance with the present invention is directed to a method of reducing distortion in an additively manufactured part, comprising forming a shrinking platform of successive layers of a composite, the composite including a metal particulate filler in a first matrix, forming a shrinking support of successive layers of the composite upon the shrinking platform, forming a first release layer of a release material upon the shrinking support, the release material including a ceramic particulate and a second matrix, and forming a part of the composite upon the shrinking support to form a portable assembly from the combined shrinking platform, shrinking support, release layer and part that is configured to be transported, debound, and sintered as a unit, wherein substantially horizontal portions of the part are vertically supported by the shrinking platform, wherein the first release layer is configured, after sintering, to separate the part from the shrinking support and to allow the part to be readily removed from the shrinking support, and wherein the shrinking support is configured to prevent the part from distorting from gravitational force during sintering.

According to one embodiment, the method further comprises depositing an open cell structure in at least one of the shrinking platform, the shrinking support, and the part, and penetrating a fluid debinder into the open cell structure to debind at least one of the first matrix and the second matrix from within the open cell structure. In one embodiment, forming the first release layer comprises forming the first release layer to intervene at a non-horizontal surface of the part opposing a surface of the shrinking support, the non-horizontal surface of the part including at least one of a vertical surface, a curved surface, and a surface angled with respect to horizontal. In another embodiment, the first binder includes a first component and a second component, and the method further comprises resisting, with the first component, deformation of the shape of the portable assembly during the simultaneous debinding of the first matrix and second matrix, and resisting, with the second component, deformation of the shape of the brown portable assembly caused by gravitational force.

According to another embodiment, the method further comprises forming a lateral support shell of the composite following a lateral contour of the part, and connecting the lateral support shell to the lateral contour of the part by forming separable attachment protrusions of the composite between the lateral support shell and the part. In one embodiment, the method further comprises forming soluble support structures that resist downward forces during the forming of the part, and dissolving the soluble support structures before heating the brown portable assembly. In another embodiment, the method further comprises forming soluble support structures of the release material that resist downward forces during the forming of the part, and debinding the second matrix to dissolve the second matrix of the soluble support structures and leave loose ceramic particulate before heating the brown portable assembly.

According to one embodiment, the method further comprises providing a sliding powder layer below the shrinking platform, of equal or larger surface area than a bottom of the shrinking platform, that reduces lateral resistance between the shrinking platform and an underlying surface, simultaneously, and in a same chamber, debinding a component of the first matrix and of the second matrix in the portable assembly to form a brown portable assembly, and heating the brown portable assembly to shrink all of the shrinking platform, the shrinking support, and the part together at a same rate as neighboring metal particles throughout the shape-retaining brown part assembly undergo atomic diffusion.

According to another embodiment, the underlying surface comprises a portable build plate, forming the shrinking platform comprises forming the shrinking platform above the portable build plate, providing the sliding powder layer comprises forming the sliding powder layer below the shrinking platform and above the portable build plate with the release material, and the method further comprises keeping the portable assembly together as a unit during the debinding, sintering the brown portable assembly during the heating, and keeping the brown portable assembly together during sintering, and after sintering, separating the build plate, sliding powder layer, shrinking platform, first release layer and shrinking support from the part. In one embodiment, the method further comprises powderizing the first release layer during the heating to leave loose ceramic powder between the opposing surfaces.

According to one embodiment, forming the shrinking platform comprises forming the shrinking platform to form a foundation for the shrinking support, all portions of the part configured to commonly shrink from lateral positions located to be supported by the foundation of the shrinking platform, and shrinking platform is configured to hold the part and the shrinking support in relative position during shrinking of the same composite and to prevent movement of the shrinking support versus the part that tends to distort the part. In one embodiment, the method further comprises forming an interior support structure of the composite in a location supported by the part, and forming a second release layer of the release material intervening between the part and the interior support structure, wherein the second support structure is configured to be displaced through space while continuously supported by the part during shrinking of the brown portable assembly, and the second release layer is configured to powderize during the heating to leave a loose powder that allows the interior support structure to be readily removed from the part after sintering.

According to another embodiment, the method further comprises forming a third release layer of the release material intervening between a surface of the part and a top surface of the shrinking platform, and forming a lowermost portion of the part from successive layers of the composite directly upon the third release layer and directly opposing the top surface of the shrinking platform. In one embodiment, the method further comprises interconnecting the composite of the shrinking platform to the composite of the shrinking support to permit mass diffusion between neighboring metal particles found in the shrinking platform adjacent metal particles found in the shrinking support, to unitarily shrink the shrinking platform and the shrinking support. In another embodiment, the metal particulate filler includes metal particles distributed in a range of sizes.

Another aspect in accordance with the present invention is directed to a method of reducing distortion in an additively manufactured part comprising depositing a shrinking platform of successive layers of a composite, the composite including a metal particulate filler in a first matrix, depositing a plurality of shrinking supports of successive layers of the composite upon the shrinking platform, interconnecting the composite of the shrinking platform to the plurality of shrinking supports to permit mass diffusion between neighboring metal particles found in the shrinking platform that are adjacent to metal particles found in the plurality of shrinking supports, to unitarily shrink the shrinking platform and plurality of shrinking supports and providing a continuous foundation for the plurality of shrinking supports, depositing a first release layer of a release material upon the plurality of shrinking supports, the release material include a ceramic powder and a second matrix, depositing a part of the composite upon the plurality of shrinking supports, depositing a portable assembly from the combined shrinking platform, the plurality of shrinking supports, release layer and part, debinding the first matrix and second matrix within the portable assembly simultaneously and in a same chamber to form a brown portable assembly, and heating the brown portable assembly to a temperature sufficient to simultaneously sinter and shrink all of the shrinking platform, the plurality of shrinking supports, and the part together at a uniform rate as neighboring metal particles undergo mass diffusion, and to powderize the first release layer to leave loose ceramic powder between opposing surfaces, wherein the loose ceramic powder separates the part from the plurality of shrinking supports and allows the part to be readily removed from the plurality of shrinking supports after sintering.

According to one embodiment, the method further comprises depositing an open cell structure in at least one of the shrinking platform, the plurality of shrinking supports, and the part, and penetrating a fluid debinder into the open cell structure to debind the matrix from within the open cell structure. In one embodiment, depositing the first release layer comprises forming the first release layer to intervene at a non-horizontal surface of the part opposing a surface of the plurality of shrinking supports, the non-horizontal surface of the part including at least one of a vertical surface, a curved surface, and a surface angled with respect to horizontal. In another embodiment, the first binder includes a first component and a second component, and the method further comprises resisting, with the first component, deformation of the shape of the portable assembly during the simultaneous debinding of the first matrix and second matrix, and resisting, with the second component, deformation of the shape of the brown portable assembly caused by gravitational force.

According to another embodiment, the method further comprises forming a lateral support shell of the composite following a lateral contour of the part, and connecting the lateral support shell to the lateral contour of the part by forming separable attachment protrusions of the composite between the lateral support shell and the part. In one embodiment, the method further comprises forming soluble support structures that resist downward forces during the depositing of the part, and dissolving the soluble support structures before heating the brown portable assembly. In another embodiment, the method further comprises forming soluble support structures of the release material that resist downward forces during the depositing of the part, and debinding the second matrix to dissolve the second matrix of the soluble support structures and leave loose ceramic particulate before heating the brown portable assembly.

According to one embodiment, the method further comprises providing a sliding powder layer below the shrinking platform, of equal or larger surface area than a bottom of the shrinking platform, that reduces lateral resistance between the shrinking platform and an underlying surface, transporting the portable assembly together as a unit from a printer to a first location for the debinding, and following debinding, transporting the brown portable assembly together from the first location to a second location for sintering, and sintering the brown portable assembly at the second location during the heating.

According to another embodiment, the underlying surface comprises a portable build plate, depositing the shrinking platform comprises forming the shrinking platform above the portable build plate, providing the sliding powder layer comprises forming the sliding powder layer below the shrinking platform and above the portable build plate with the release material, transporting the portable assembly comprises transporting the portable assembly together with the build plate as the unit from the printer to the first location for the debinding, transporting the brown portable assembly comprises, following debinding, transporting the brown portable assembly together with the build plate from the first location to the second location for sintering, and the method further comprises, following sintering, separating the build plate, sliding powder layer, shrinking platform, first release layer and the plurality of shrinking supports from the part. In one embodiment, the method further comprises powderizing the first release layer during the heating to leave loose ceramic powder between the opposing surfaces.

According to one embodiment, depositing the shrinking platform comprises forming the shrinking platform to be laterally larger than the part, and the shrinking platform holds the part and the support structure in relative position during shrinking of the composite and prevents movement of the support structure versus the part that tends to distort the part. In one embodiment, the method further comprises forming an interior support structure of the composite in a location supported by the part, and forming a second release layer of the release material intervening between the part and the interior support structure, wherein the interior support structure is displaced through space while continuously supported by the part during shrinking of the brown portable assembly, and the second release layer powderizes during the heating to leave a loose powder that allows the interior support structure to be readily removed from the part after sintering.

According to another embodiment, the method further comprises forming a third release layer of the release material intervening between a surface of the part and a top surface of the shrinking platform, and forming a lowermost portion of the part from successive layers of the composite directly upon the third release layer and directly opposing the top surface of the shrinking platform. In one embodiment, the metal particulate filler includes metal particles distributed in a range of sizes. In another embodiment, the composite including the metal composite material is deposited by one of fused deposition modeling or binder jetting.

DETAILED DESCRIPTION

Figure 1:
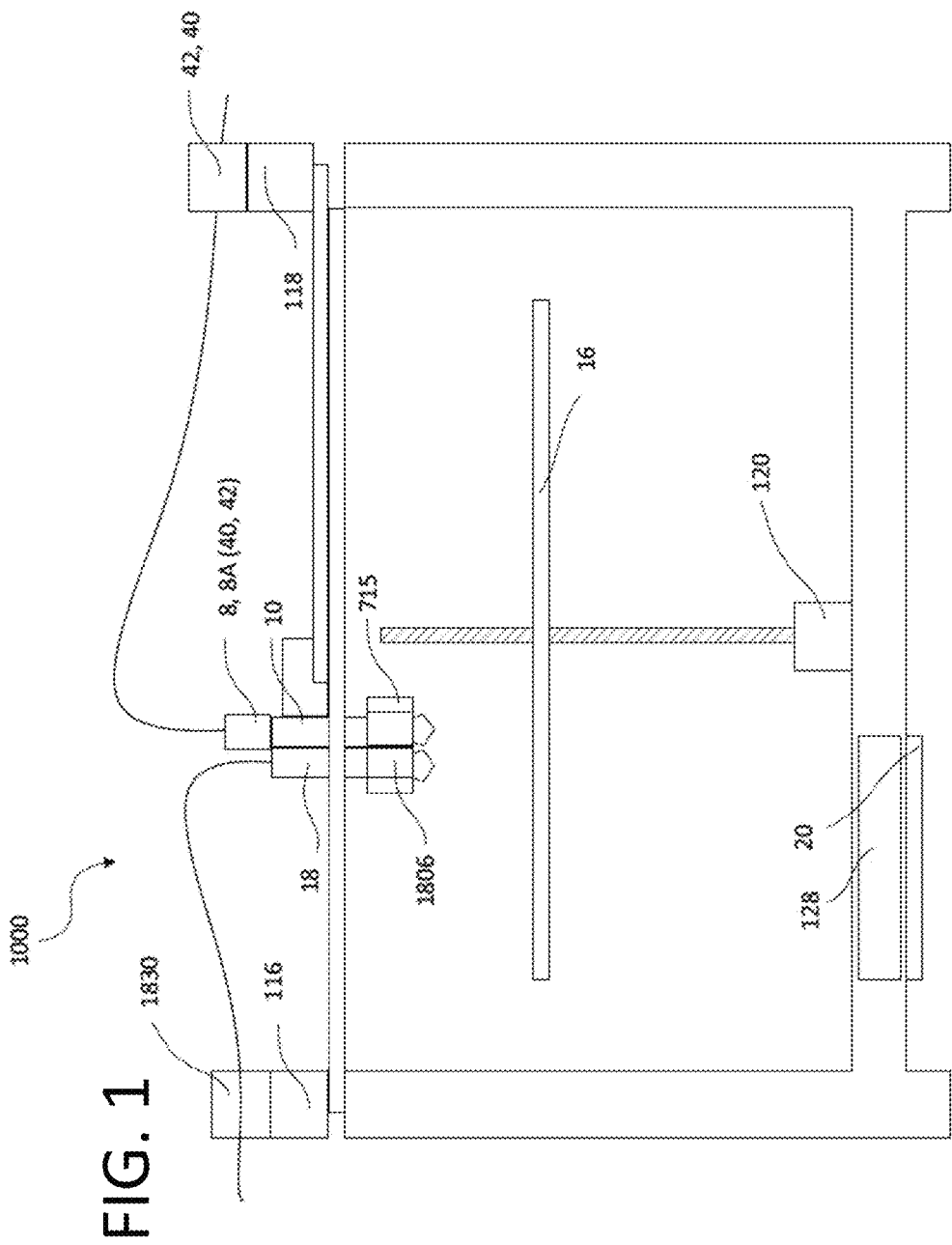
FIG. 1 is a schematic representation of three-dimensional metal printer.

This patent application incorporates the following disclosures by reference in their entireties: U.S. Patent Application Ser. Nos. 61/804,235; 61/815,531; 61/831,600; 61/847,113; 61/878,029; 61/880,129; 61/881,946; 61/883,440; 61/902,256; 61/907,431; and 62/080,890; Ser. Nos. 14/222,318; 14/297,437; and Ser. No. 14/333,881, may be referred to herein as "Composite Filament Fabrication patent applications" or "CFF patent applications". Although the present disclosure discusses various metal or ceramic 3D printing systems, at least the mechanical and electrical motion, control, and sensor systems of the CFF patent applications may be used as discussed herein. In addition, U.S. Pat. Nos. 6,202,734; 5,337,961; 5,257,657; 5,598,200; 8,523,331; 8,721,032, and U.S. Patent Publication No. 20150273577, are incorporated herein by reference in their entireties.

In 3D printing, in general, overhanging or jutting portions of a part may require removable and/or soluble and/or dispersing supports underneath to provide a facing surface for deposition. In metal printing, in part because metal is particularly dense (e.g., heavy), removable and/or soluble and/or dispersing supports may also be helpful to prevent deformation, sagging, during mid- or post-processing—for example, to preserve shape vs. drooping or sagging in potentially deforming environments like high heat.

Printing a sinterable part using a 3D printing material including a binder and a ceramic or metal sintering material is aided by support structures, able to resist the downward pressure of, e.g., extrusion, and locate the deposited bead or deposition in space. A release layer intervening between the support structures and the part includes a higher melting temperature material—ceramic or high temperature metal for example, optionally deposited with a similar (primary) matrix or binder component to the model material. Beneath the release layer, the model material as the part is used for support structures, promoting the same compaction/densification. This tends to mean the part and the supports will shrink uniformly, maintaining dimensional accuracy of the part. At the bottom of the support, a release layer may also be printed. In addition, the support structures may be printed sections with release layers, such that the final sintered support structures will readily break into smaller subsections for easy removal, optionally in the presence of mechanical or other agitation. In this way, a large support structure can be removed from an internal cavity via a substantially smaller hole. In addition, or in the alternative, a further method of support is to print soluble support material that is removed in the debinding process. For catalytic debind, this may be Delrin (POM) material. One method to promote uniform shrinking is to print a ceramic release layer as the bottom most layer in the part. On top of the sliding release layer (analogous to microscopic ball bearings) a thin sheet of metal—e.g., a raft—may be printed that will uniformly shrink with the part, and provide a "shrinking platform" to hold the part and the related support materials in relative position during the shrinking process. Optionally staples or tacks, e.g., attachment points, connect and interconnect the model material portions being printed.

The printer(s) of FIGS. 1-9, with at least two print heads 18, 10 and/or printing techniques, deposit with one head a composite material including a debinder and dispersed spheres or powder 18 (thermoplastic or curing), used for printing both a part and support structures, and with a second head 18a (shown in FIGS. 4-9) deposits release or separation material. Optionally a third head and/or fourth head include a green body support head 18b and/or a continuous fiber deposition head 10. A fiber reinforced composite filament 2 (also referred to herein as continuous core reinforced filament) may be substantially void free and include a polymer or resin that coats, permeates or impregnates an internal continuous single core or multistrand core. It should be noted that although the print head 18, 18a, 18b are shown as extrusion print heads, "fill material print head" 18, 18a, 18b as used herein may include optical or UV curing, heat fusion or sintering, or "polyjet", liquid, colloid, suspension or powder jetting devices—not shown—for depositing fill material, so long as the other functional requirements described herein are met (e.g., green body material supports printing vs. gravity or printing forces, sintering or shrinking supports the part vs. gravity and promote uniform shrinking via atomic diffusion during sintering, and release or separation materials substantially retain shape through debinding stems but become readily removable, dispersed, powderized or the like after sintering).

Although FIGS. 1-9 in general show a Cartesian arrangement for relatively moving each print head in 3 orthogonal translation directions, other arrangements are considered within the scope of, and expressly described by, a drive system or drive or motorized drive that may relatively move a print head and a build plate supporting a 3D printed part in at least three degrees of freedom (i.e., in four or more degrees of freedom as well). For example, for three degrees of freedom, a delta, parallel robot structure may use three parallelogram arms connected to universal joints at the base, optionally to maintain an orientation of the print head (e.g., three motorized degrees of freedom among the print head and build plate) or to change the orientation of the print head (e.g., four or higher degrees of freedom among the print head and build plate). As another example, the print head may be mounted on a robotic arm having three, four, five, six, or higher degrees of freedom; and/or the build platform may rotate, translate in three dimensions, or be spun.

A fiber reinforced composite filament, when used, is fed, dragged, and/or pulled through a conduit nozzle optionally heated to a controlled temperature selected for the matrix material to maintain a predetermined viscosity, force of adhesion of bonded ranks, melting properties, and/or surface finish. After the matrix material or polymer of the fiber reinforced filament is substantially melted, the continuous core reinforced filament is applied onto a build platen 16 to build successive layers of a part 14 to form a three dimensional structure. The relative position and/or orientation of the build platen 16 and print heads 18, 18a, 18b, and/or 10 are controlled by a controller 20 to deposit each material described herein in the desired location and direction. A driven roller set 42, 40 may drive a continuous filament along a clearance fit zone that prevents buckling of filament. In a threading or stitching process, the melted matrix material and the axial fiber strands of the filament may be pressed into the part and/or into the swaths below, at times with axial compression. As the build platen 16 and print head(s) are translated with respect to one another, the end of the filament contacts an ironing lip and be subsequently continually ironed in a transverse pressure zone to form bonded ranks or composite swaths in the part 14.

With reference to FIG. 1, each of the printheads 18, 18a, 18b, 10 may be mounted on the same linear guide or different linear guides or actuators such that the X, Y motorized mechanism of the printer moves them in unison. As shown, each extrusion printhead 18, 18a, 18b may include an extrusion nozzle with melt zone or melt reservoir, a heater, a high thermal gradient zone formed by a thermal resistor or spacer (optionally an air gap), and/or a Teflon or PTFE tube. A 1.75-1.8 mm; 3 mm; or larger or smaller thermoplastic filament is driven through, e.g., direct drive or a Bowden tube provides extrusion back pressure in the melt reservoir.

Figure 2:
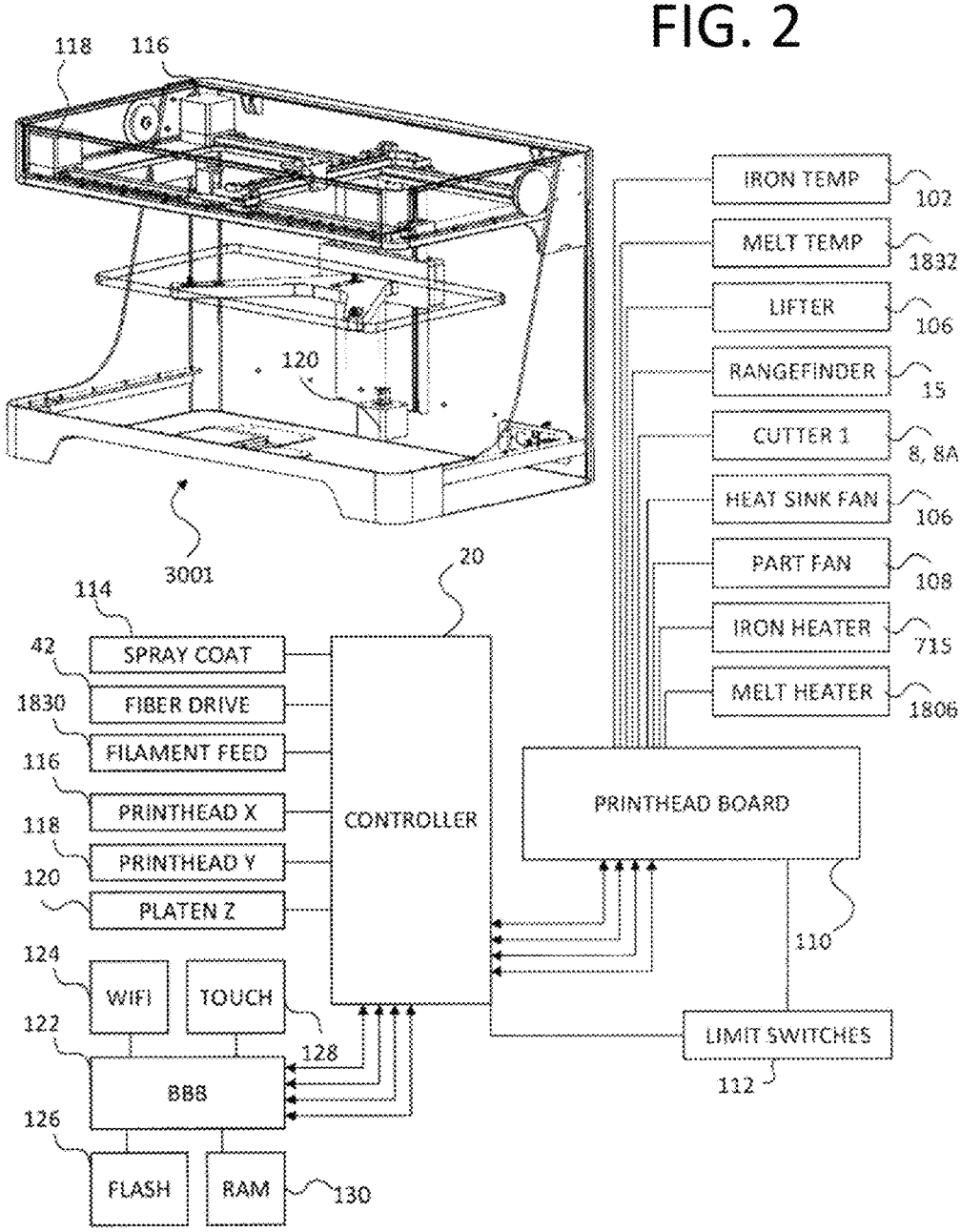
FIG. 2 is a block diagram and schematic representation of a three dimensional printer system.

FIG. 2 depicts a block diagram and control system of the three dimensional printer which controls the mechanisms, sensors, and actuators therein, and executes instructions to perform the control profiles depicted in and processes described herein. A printer is depicted in schematic form to show possible configurations of e.g., three commanded motors 116, 118, and 120. It should be noted that this printer may include a compound assembly of printheads 18, 18a, 18b, and/or 10.

As depicted in FIG. 2, the three-dimensional printer 3001 includes a controller 20 which is operatively connected to the fiber head heater 715, the fiber filament drive 42 and the plurality of actuators 116, 118, 120, wherein the controller 20 executes instructions which cause the filament drive to deposit and/or compress fiber into the part. The instructions are held in flash memory and executed in RAM (not shown; may be embedded in the controller 20). An actuator 114 for applying a spray coat, as discussed herein, may also be connected to the controller 20. In addition to the fiber drive 42, respective filament feeds 1830 (e.g., up to one each for heads 18, 18a, and/or 18b) may be controlled by the controller 20 to supply the extrusion printhead 1800. A printhead board 110, optionally mounted on the compound printhead and moving therewith and connected to the main controller 20 via ribbon cable, breaks out certain inputs and outputs. The temperature of the ironing tip 726 may be monitored by the controller 20 by a thermistor or thermocouple 102; and the temperature of the heater block holding nozzle 1802 of any companion extrusion printhead 1800 may be measured by respective thermistors or thermocouples 1832. A heater 715 for heating the ironing tip 726 and respective heater 1806 for heating respective extrusion nozzles 1802 are controlled by the controller 20. Heat sink fan(s) 106 and a part fan(s) 108, each for cooling, may be shared between the printheads, or independently provided, and controlled by the controller 20. A rangefinder 15 is also monitored by the controller 20. The cutter 8 actuator, which may be a servomotor, a solenoid, or equivalent, is also operatively connected. A lifter motor for lifting one or any printhead away from the part (e.g., to control dripping, scraping, or rubbing) may also be controlled. Limit switches 112 for detecting when the actuators 116, 118, 120 have reached the end of their proper travel range are also monitored by the controller 20.

As depicted in FIG. 2, an additional breakout board 122, which may include a separate microcontroller, provides user interface and connectivity to the controller 20. An 802.11 Wi-Fi transceiver connects the controller to a local wireless network and to the Internet at large and sends and receives remote inputs, commands, and control parameters. A touch screen display panel 128 provides user feedback and accepts inputs, commands, and control parameters from the user. Flash memory 126 and RAM 130 store programs and active instructions for the user interface microcontroller and the controller 20.

Figure 3:
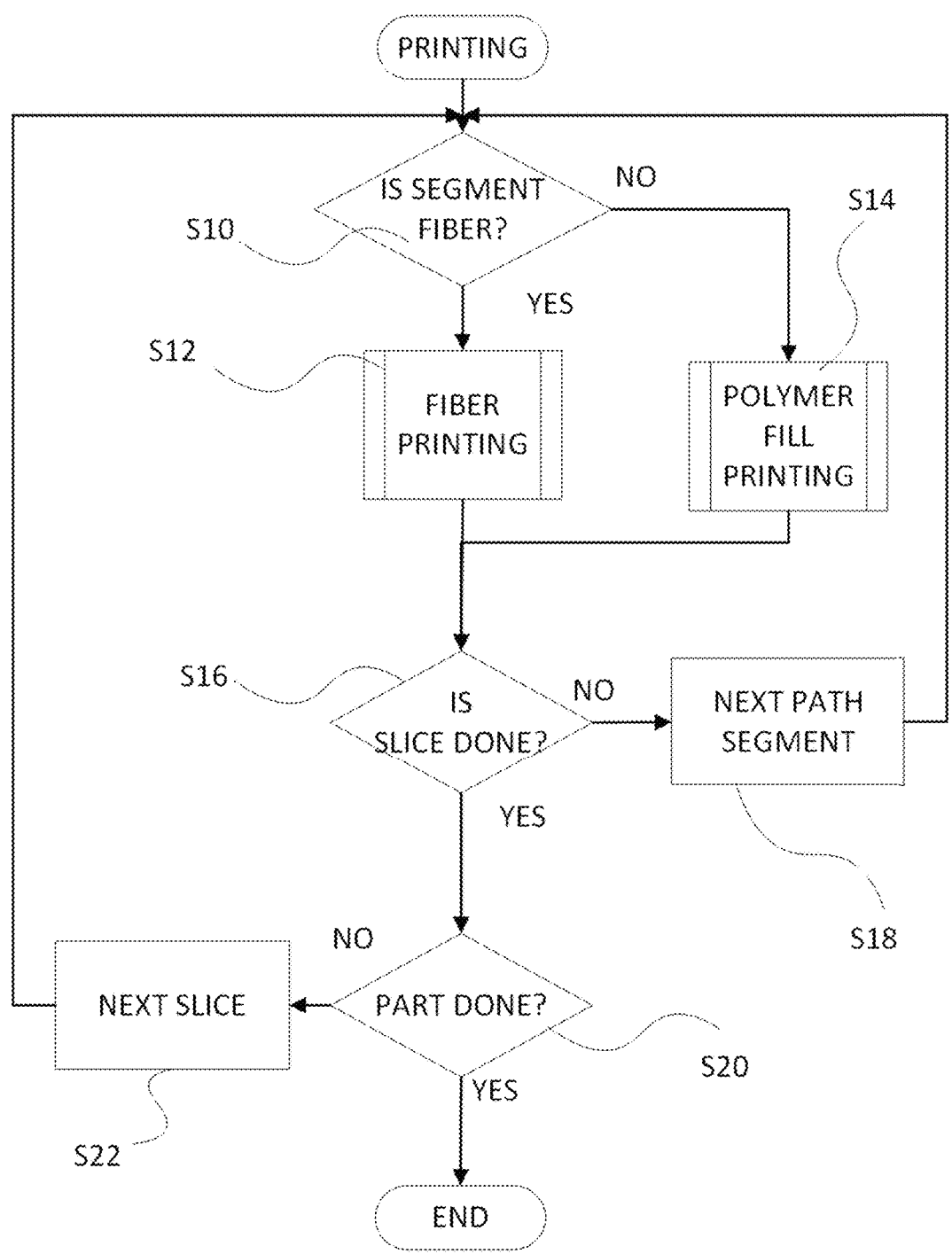
FIG. 3 is a flowchart describing the overall operation of the 3D printer of FIG. 2.

FIG. 3 depicts a flowchart showing a printing operation of the printers 1000 in FIGS. 1-9. FIG. 3 describes, as a coupled functionality, control routines that may be carried out to alternately and in combination use the co-mounted FFF extrusion head(s) 18, 18a, and/or 18b and a fiber reinforced filament printing head as in the CFF patent applications.

In FIG. 3, at the initiation of printing, the controller 20 determines in step S10 whether the next segment to be printed is a fiber segment or not, and routes the process to S12 in the case of a fiber filament segment to be printed and to step S14 in the case of other segments, including e.g., base, fill, or coatings. After each or either of routines S12 and S14 have completed a segment, the routine of FIG. 3 checks for slice completion at step S16, and if segments remain within the slice, increments to the next planned segment and continues the determination and printing of fiber segments and/or non-fiber segments at step S18. Similarly, after slice completion at step S16, if slices remain at step S20, the routine increments at step S22 to the next planned slice and continues the determination and printing of fiber segments and/or non-fiber segments. "Segment" as used herein corresponds to "toolpath" and "trajectory", and means a linear row, road, or rank having a beginning and an end, which may be open or closed, a line, a loop, curved, straight, etc. A segment begins when a printhead begins a continuous deposit of material, and terminates when the printhead stops depositing. A "slice" is a single layer or lamina to be printed in the 3D printer, and a slice may include one segment, many segments, lattice fill of cells, different materials, and/or a combination of fiber-embedded filament segments and pure polymer segments. A "part"

includes a plurality of slices to build up the part. FIG. 3's control routine permits dual-mode printing with one, two, or more (e.g., four) different printheads, including the compound printheads 18, 18a, 18b, and/or 10.

All of the printed structures previously discussed may be embedded within a printed article during a printing process, as discussed herein, expressly including reinforced fiber structures of any kind, sparse, dense, concentric, quasi-isotropic or otherwise as well as fill material or plain resin structures. In addition, in all cases discussed with respect to embedding in a part, structures printed by fill material heads 18, 18a, 18b using thermoplastic extrusion deposition may be in each case replaced with soluble material (e.g., soluble thermoplastic or salt) to form a soluble preform which may form a printing substrate for part printing and then removed. All continuous fiber structures discussed herein, e.g., sandwich panels, shells, walls, reinforcement surrounding holes or features, etc., may be part of a continuous fiber reinforced part.

Using the 3D printer herein discussed with reference to FIGS. 1-9 inclusive, which may deposit either fill material (composite with a debindable matrix containing metal, ceramic, and/or fibers), soluble (e.g., "soluble" also including, in some cases, debindable by thermal, pyrolytic or catalytic process) material, or continuous fiber, the reinforcing fiber may be additive [0034] With reference to FIGS. 1 and 2, each of the printheads 18 and 10 are mounted on the same linear guide such that the X, Y motorized mechanism 116, 118 of the printer 1000 moves them in unison. A 1.75-1.8 mm; 3 mm or larger or smaller metal filament 10b may be driven through, e.g., direct drive or a Bowden tube that may provide extrusion back pressure in a melt reservoir 10a or crucible.

Commercially valuable metals suitable for printing include aluminum, titanium and/or stainless steel as well as other metals resistant to oxidation at both high and low temperatures (e.g., amorphous metal, glassy metal or metallic glass).

One form of post-processing is sintering. By molding or 3D printing as described herein, a green body may be formed from an appropriate material, including a binder or binders and a powdered or spherized metal or ceramic (of uniform or preferably distributed particle or sphere sizes). A brown body may be formed from the green body by removing one or more binders (using a solvent, catalysis, pyrolysis). The brown body may retain its shape and resist impact better than the green body due to remelting of a remaining binder. When the brown body is sintered at high temperature and/or pressure, remaining binder may pyrolise away, and the brown body uniformly contracts as it sinters. The sintering may take place in an inert gas, a reducing gas, a reacting gas, or a vacuum. Application of heat (and optionally) pressure eliminates internal pores, voids and microporosity between and within the metal or ceramic beads through at least diffusion bonding and/or atomic diffusion. Supporting material, either the same or different from model material, supports the part being printed, post-processed, or sintered versus the deposition force of printing itself and/or versus gravity, particularly for unsupported straight or low-angle spans or cantilevers.

As noted, printing a part is aided by the support structures, able to resist the downward pressure of, e.g., extrusion, and locate the deposited bead or deposition in space. As discussed herein a release layer includes in a higher melting temperature material—ceramic for example, optionally deposited via similar (primary) matrix component to the model material. Beneath the release layer, the same (metal) material is used as the part, promoting the same compaction/densification. This tends to mean the part and the supports will shrink uniformly, maintaining dimensional accuracy of the part. At the bottom of the support, a release layer may also be printed. In addition, the support structures may be printed sections with release layers, such that the final sintered support structures will readily break into smaller subsections for easy removal, optionally in the presence of mechanical or other agitation. In this way, a large support structure can be removed from an internal cavity via a substantially smaller hole. In addition, or in the alternative, a further method of support is to print soluble support material that is removed in the debinding process. For catalytic debind, this may be Delrin (POM) material. One method to promote uniform shrinking is to print a ceramic release layer as the bottom most layer in the part. On top of the sliding release layer (analogous to microscopic ball bearings) a thin sheet of metal—e.g., a raft—may be printed that will uniformly shrink with the part, and provide a "shrinking platform" to hold the part and the related support materials in relative position during the shrinking process. Optionally staples or tacks, e.g., attachment points, connect and interconnect the model material portions being printed.

Figure 4:
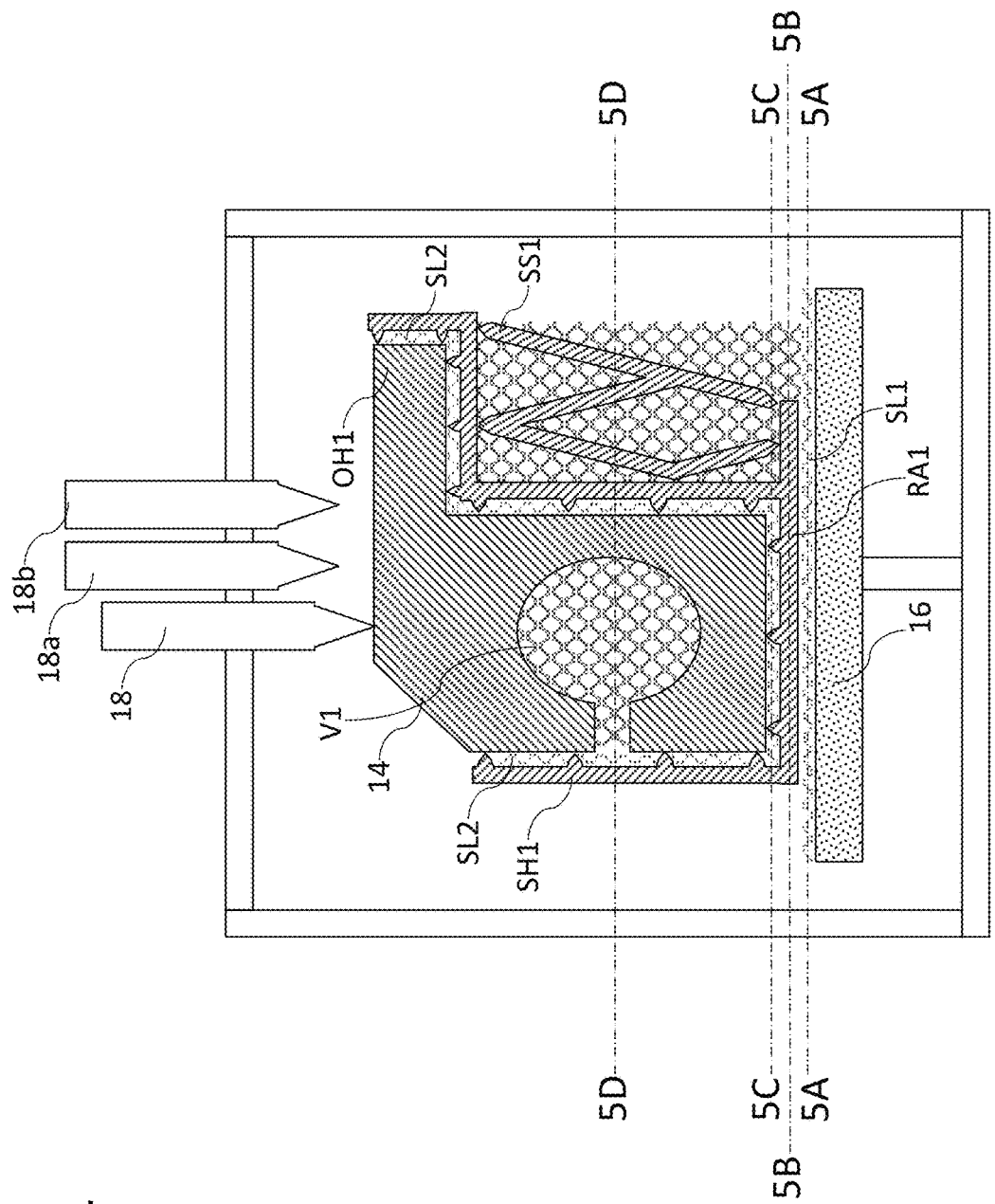
FIG. 4 is a schematic representation of a 3D printing system, part, and process in which sintering supports (e.g. shrinking supports) are provided.

FIGS. 4 through 7 show, in schematic form, additional explanation of relevant processes, structures, materials, and systems. As shown in FIGS. 4-7, a 3D printer suitable for the deposition phase of the process may include one, two, three, or more deposition heads for depositing model material and supports (as well as, e.g., a continuous composite deposition head). As shown in FIG. 4, a model material deposition head 18 deposits a composite material including metal or ceramic spherized powder as well as a meltable or matrix of binding polymers, waxes, and/or other utility components. In the model material deposition head 18, the process may use a low-diameter filament (e.g., 1-4 mm) as both material supply and back pressure for extrusion. In this case, the model material extrusion filament may be stiff, yet reasonably pliable as supplied (e.g., 0.1-3.0 GPa flexural modulus) and reasonably viscous when fluidized (e.g., melt or dynamic viscosity of 100-10,000 Pa·s, preferably 300-1000 Pa·s) in order to support bridging while printing across gaps or spans, even absent green body supports or sintering (i.e., shrinking) supports below.

Figure 7:
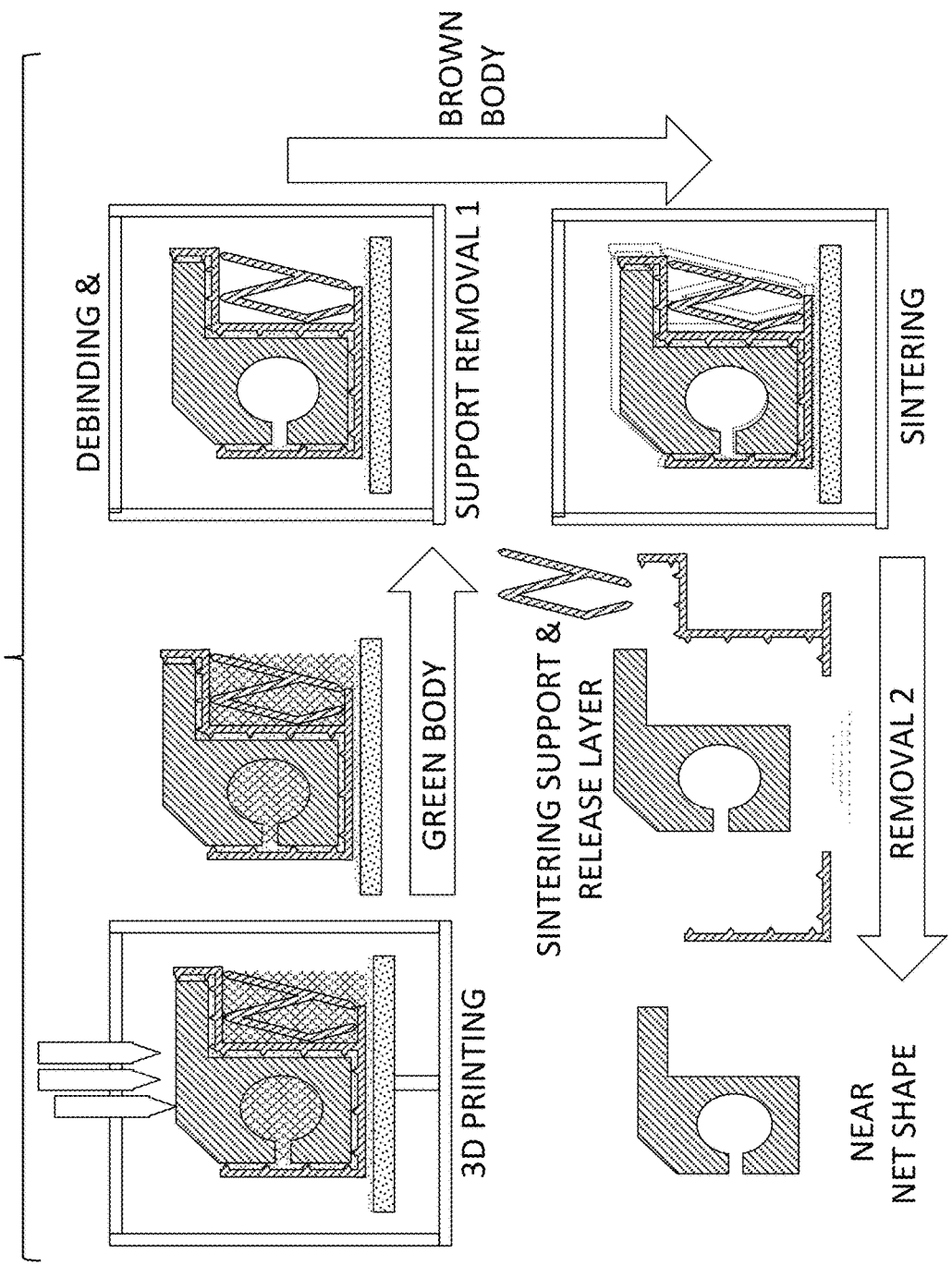
FIG. 7 is a schematic representation of one exemplary process of printing, debinding, sintering, and support removal with separation and/or release layers, green body supports and/or sintering or shrinking supports.

In the 3D printer and exemplary part shown in FIG. 4, a separation or release material deposition head 18-S and a green body support material deposition head 18-G may additionally be supported to move in at least three relative degrees of freedom with respect to the part P1 being printed. As discussed herein, the separation material may in some cases serve as a green body support, so alternatively, as shown in FIG. 7, only one head 18-SG may deposit both green body support material and separation material. As shown in FIG. 4, from bottom to top (in this case, 3D printing is performed from the bottom up), in these exemplary processes the first layer printed is a raft separation layer or sliding release layer SL1 printed from, e.g., the separation material deposition head 18-SG. The separation material may be, as noted herein, of similar debinding materials to the model material, but, e.g., with a ceramic or other spherical powder filler (e.g., particulate) that does not sinter, melt, or otherwise bind at the sintering temperature of the model material. Consequently, the separation material may have its debinding material completely removed by solvent, catalysis, pyrolysis, leaving behind a dispersible and/or removable powder (e.g., after sintering, the powder of the separation material remaining unsintered even after the sintering process). "Separation" and "release" are generally used interchangeably herein.

FIGS. 5A-5D show selected sections through FIG. 4 for the purpose of discussing printing and other process steps. It should be noted that the Figures are not necessarily to scale. In particular, very small clearances or material-filled clearances (e.g., separation or release layers) or components (e.g., protrusions for snap removal) may be shown at exaggerated scales for the purpose of clear explanation. Moreover, it should also be noted that in some cases, solid bodies are shown to simplify explanation, but the internal structure of the solid bodies herein may be 3D printed with infill patterns (e.g., honeycombs) and/or may include chopped, short, long, or continuous fiber reinforcement as discussed in the CFF Patent Applications.

Figure 5B:
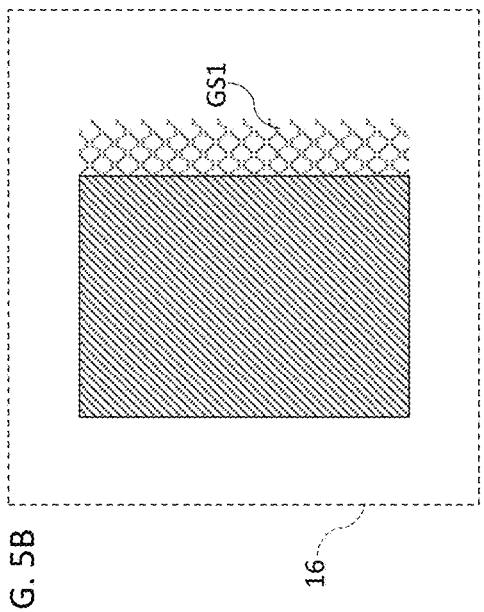
FIGS. 5A-5D are schematic sections through the diagram of FIG. 4.
Figure 5D:
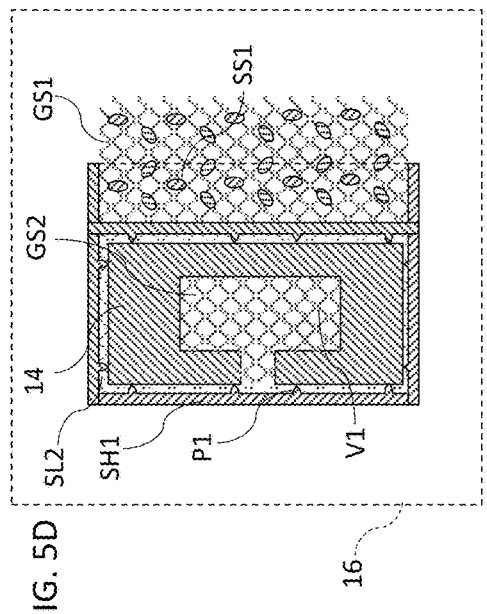
Figure 5A:
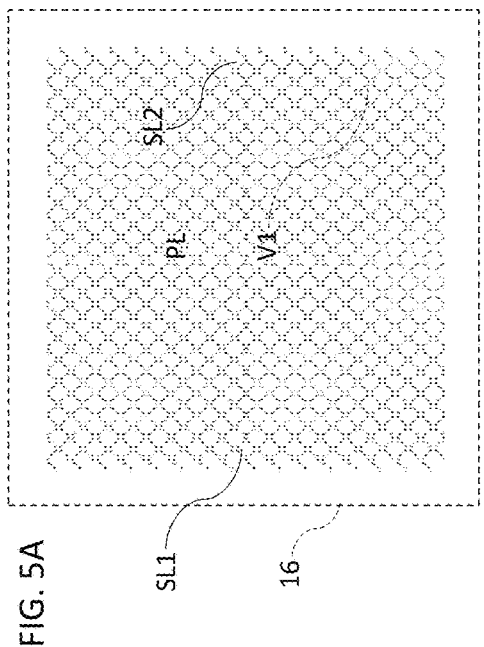

As shown in FIGS. 4 and 5A, upon an optionally removable and transportable, optionally ceramic build plate 16, a raft separation layer SL1 is printed to permit a raft RA1 printed above to be readily removed from the build plate 16, in some cases before debinding, or in some cases when the (e.g., portable) build plate 16 itself is still attached through the debinding process (in the example shown in FIG. 7).

As shown in FIGS. 4 and 5B, following the printing of the raft separation layer SL1, a raft or shrinking platform RA1 of model material (e.g., metal-bearing composite) is printed. The raft or shrinking platform RA1 is printed, e.g., for a purpose of providing a continuous model material foundation or material interconnection among the part and its supports, so that the process of mass transport and shrinking during sintering is uniformly carried out about a common centroid or center of mass. The raft RA1 may serve other purposes—e.g., improving early adhesion, clearing environmentally compromised (e.g., wet, oxidized) material from a supply path, or conditioning printing nozzles or other path elements (e.g., rollers), etc. As noted, two general classes of supports may be used: green body supports (which support the part being printed during the printing process, but are removed before or during sintering) and sintering (e.g., shrinking) supports (which support the part being sintered during the sintering process). Some supports may serve both roles. As shown in FIGS. 4 and 5B, should an upper portion of the entire print benefit from green body supports, the lower layers of green body supports GS1 may be printed upon either the build plate 16, or as shown in FIGS. 4 and 5B, upon the separation layer SL1 and/or the raft or shrinking platform RA1.

Figure 5C:
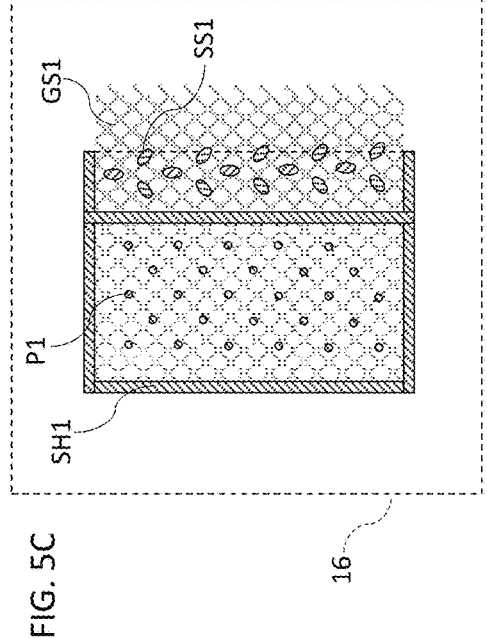

As shown in FIGS. 4 and 5C, subsequently, the raft RA1 may be continued into a surrounding or lateral shell support structure SH1 (either contiguously or via a parting line PL and/or physical separation structure, e.g., a pinched and/or wasp-waisted and/or perforated or otherwise weakened cross-section that may be flexed to break away). Further, separation structures—in this case model material protrusions P1 as well as an optionally intervening separation layer SL2—may be printed between the raft RA1 and shell SH1 to permit the removal of the raft RA1 and shell SH1 subsequent to sintering. The printing of green body supports GS1 is continued, in this case providing printing support to angled (e.g., 10-45 degrees from vertical), sparse and/or branching sintering (e.g., shrinking) supports SS1 printed to later provide sintering support for an overhanging or cantilevered portion OH1, as well as building up a green body support GS1 for printing support for the same overhanging or cantilevered portion OH1. "Printing support" may mean support vs. printing back pressure or gravity during printing, while "sintering support" may mean support vs. gravity, support vs. other external/internal stress during sintering, or providing interconnections facilitating evenly distributed mass transport and/or atomic diffusion. Although an overhanging or cantilevered portion OH1 is show in FIG. 4, an unsupported span, even if contiguous to the part P1 at two opposing sides, may also benefit from supports as described.

As shown in FIGS. 4 and 5D, the surrounding shell support structure SH1 is continued printing in layers, and optionally interconnected vertically or diagonally to the part 14 via, e.g., protrusions P1 of model material connected to the shell support structure SH1, and/or separation layer material SL2 material. The parting lines and separation structures similarly are continued vertically. An internal volume V1 in the part P1, in this case a cylindrical volume V1, is printed with green body supports GB2—if the model material is sufficiently viscous or shape-retaining during printing, the 3D printing process may bridge gaps or diagonally stack, and internal volumes with sloping walls or arch-like walls may not require sintering supports. Alternatively, the internal volume V1 is printed with sintering supports, or a combination of green body supports and sintering supports, e.g., as with the supports below overhang OH1. The internal volume V1 is printed with a channel to the outside of the part to permit support material to be removed, cleaned away, or more readily accessed by heat transfer or fluids or gasses used as solvents or catalysis. The green body supports GS1 and branching sintering supports SS1 are similarly continued to later provide sintering support for an overhanging or cantilevered portion OH1, as well as building up a green body support GS1 for printing support for the same overhanging or cantilevered portion OH1.

As shown in FIGS. 4 and 5D, an overhang or cantilevered portion OH1 may be supported by sintering supports SS1 at an angle, so long as the sintering supports are self-supporting during the printing process e.g., either by the inherent stiffness, viscosity, or other property of the model material as it is printed in layers stacking up at a slight offset (creating the angle), or alternatively or in addition with the lateral and vertical support provided by, e.g., the green body supports GS1. The sintering supports must also be robust to remain integral with the part 14 or supporting the part 14 through the sintering process.

Finally, as shown in FIG. 4, the remainder of the part 14, support shell structure SH1, sintering (e.g., shrinking) supports SS1, and green body supports GS1, GS2 are printed to completion. As printed, essentially all portions of the part 14 are supported in a vertical direction either via green body supports GS1, GS2, sintering (e.g., shrinking) supports SS1, the raft RA1, separation layer SL1 and/or SL2. Portions of the part 14, or structures within the part 14 that are self-supporting (because, e.g., of the material properties of the model material composite, or external bodies providing support, and/or those which are sufficiently stiff during support removal, debinding, and/or sintering) need not be supported vs. gravity. In addition, the support structures SS1, the raft RA1, and/or the shell structure SH1 are interconnected with model material to the part 14 in a manner that tends to shrink during sintering about a same centroid or center of mass or at least maintain relative local scale with respect to the neighboring portion of the part 14. Accordingly, during the approximately 20% uniform shrinking of the sintering process, these support structures shrink together with the part 14 and continue to provide support vs. gravity.

Figure 6:
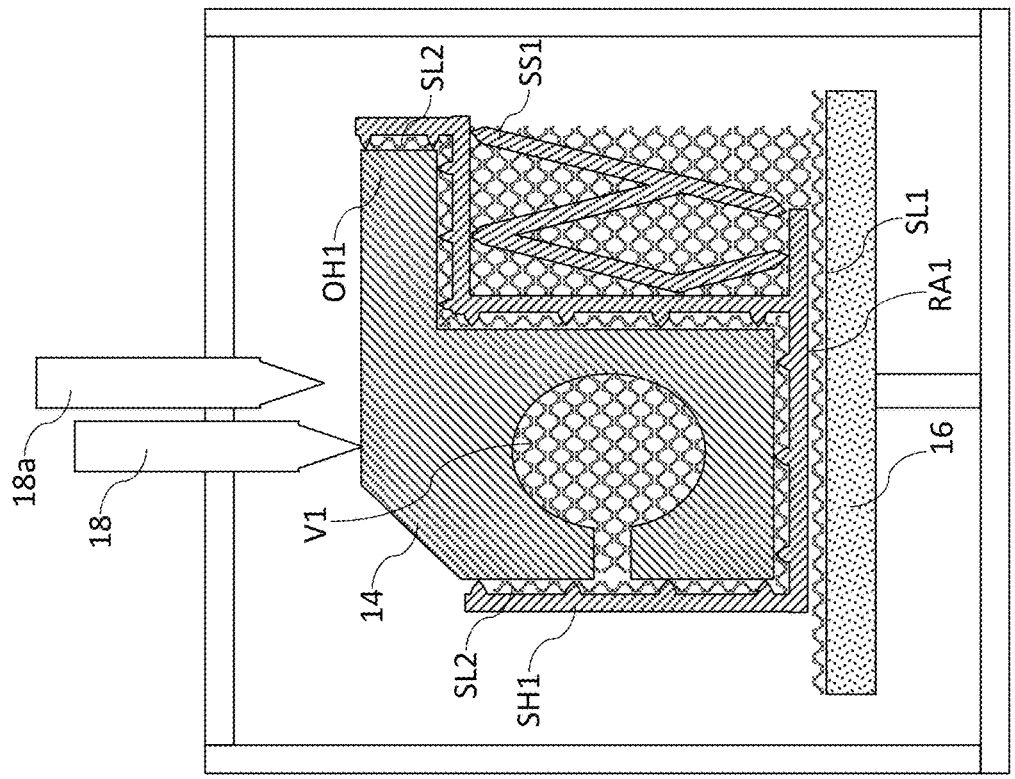
FIG. 6 is a schematic representation of an alternative 3D printing system, part, and process to that of FIG. 4.

FIG. 6 shows a variation of the 3D printer, printing method, part structure, and materials of FIG. 4. In FIG. 6, no separate green body support deposition head 18c is provided. Accordingly, green body supports and separation layers are formed from the same material—e.g., the composite material used for separation layers, in which a ceramic or high-temperature metal particles or spheres are distributed in an, e.g., two-stage debindable matrix. In this case, the green body supports are not necessarily removed during or before debinding or in a separate process, but are instead simply weakened during debinding and, as with the separation layers, have their remaining polymer material pyrolized during sintering. The remaining ceramic powder can be cleaned out and/or removed following sintering, at the same time as the separation layers.

FIG. 7 shows one overall schematic of the process. Initially, in the 3D printing phase, the part 14, together with its green body supports, sintering supports, and separation layers, is printed in a 3D printer as described. The green body, including all of these, optionally still bound to a ceramic or other material build plate 16, is transferred to a debinding chamber (optionally, the debinding chamber is integrated in the 3D printer or vice versa). As noted, if the green body supports are made of a different polymer or substance than the first stage debinding material, a separate process may remove the green body supports before debinding. If the green body supports are made from either the same or similar substances as the first stage debinding material, or one that responds to the debinding process by decomposing or dispersing, the green body supports may be removed during debinding. Accordingly, as shown in FIG. 7, debinding includes removing a first binder component from the model material using a thermal process, a solvent process, a catalysis process, or a combination of these, leaving a porous brown body structure ("DEBINDING"), and may optionally include dissolving, melting, and/or catalyzing away the green body supports ("SUPPORT REMOVAL 1").

Continuing with FIG. 7, as shown, a brown body is transferred to a sintering chamber or oven (optionally combined with the printer and/or debinding chamber). The brown body includes the part, optionally a surrounding shell structure, and optionally sintering supports. As noted, the surrounding shell structure and sintering (e.g., shrinking) supports are different aspects of sintering support structure. Optionally, intervening between the shell structure and/or sintering supports are separation layers, formed from, e.g., the separation material. Optionally, intervening between the shell structure and/or sintering supports are protrusions or ridges of model material interconnecting these to the part. Optionally, the same or a similar separation material intervenes between the brown body and the build plate. During sintering, the brown body uniformly shrinks by approximately 20%, closing internal porous structures in the brown body by atomic diffusion. The second stage debinding component of the model material may be pyrolised during sintering (including, for example, with the assistance of catalyzing or other reactive agents in gas or otherwise flowable form).

As shown in FIG. 7, a sintered body can be removed from the sintering oven. The supporting shell structure and the sintering supports can be separated or broken up along parting lines, and/or along separation layers, and or by snapping or flexing protrusion connections, tacks or other specifically mechanically weak structures. The separation layers are powderized and are readily removed. Should the green body supports be formed from the separation material, the green body supports are similarly powderized and may be readily removed.

Figure 8:
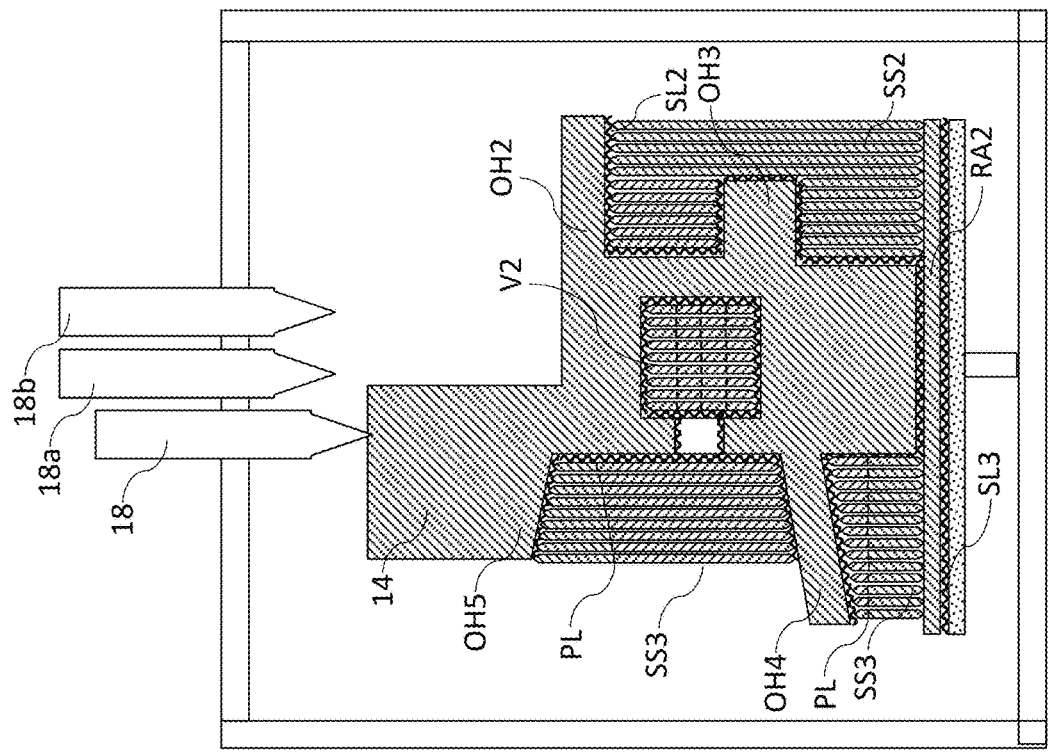
FIG. 8 is an schematic representation of an additional alternative 3D printing system, part, and process to that of FIG. 4.
Figure 12:
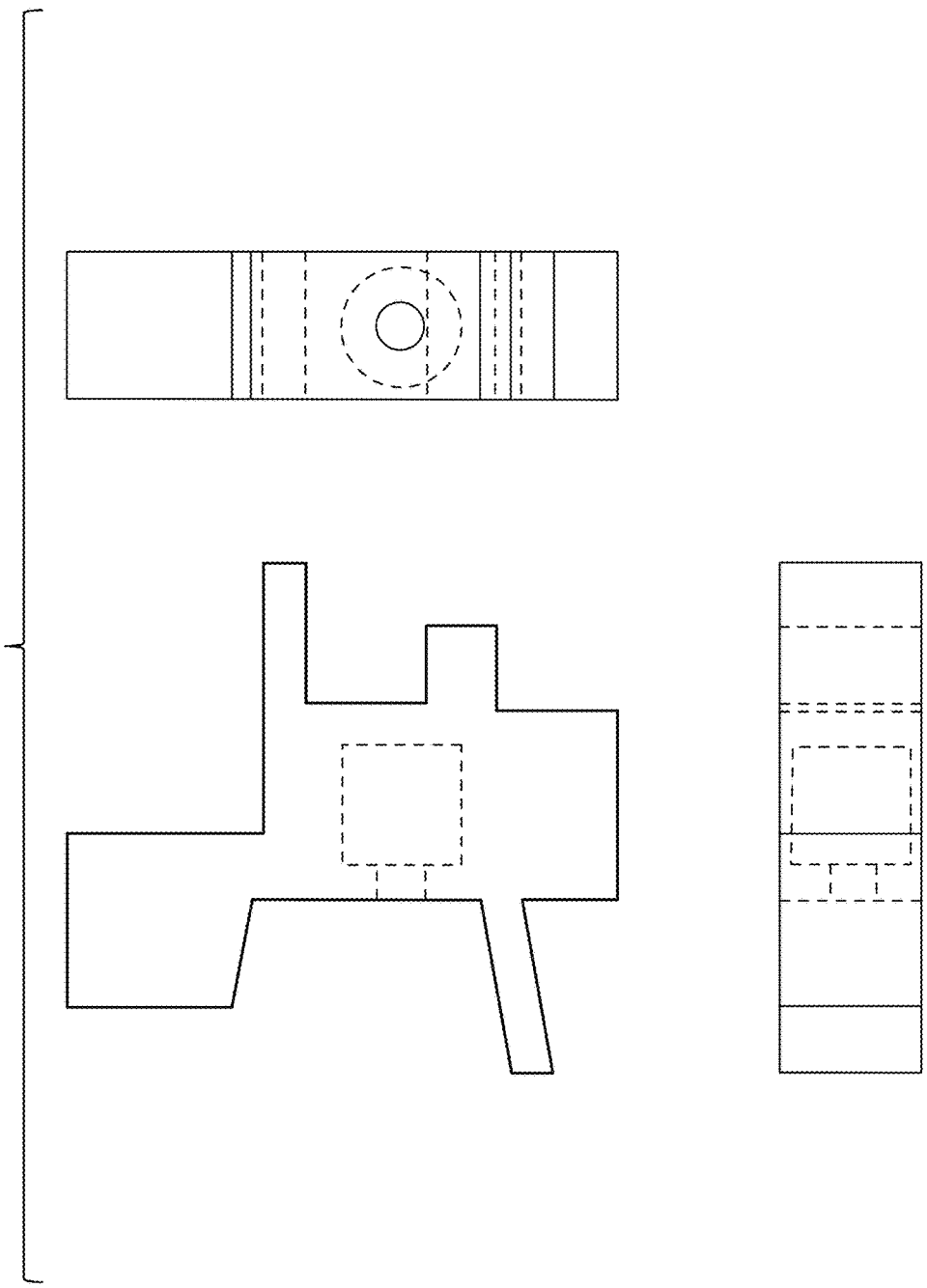
FIGS. 12 and 13 are 3D views of the part schematically depicted FIGS. 8 and 9.
Figure 13:
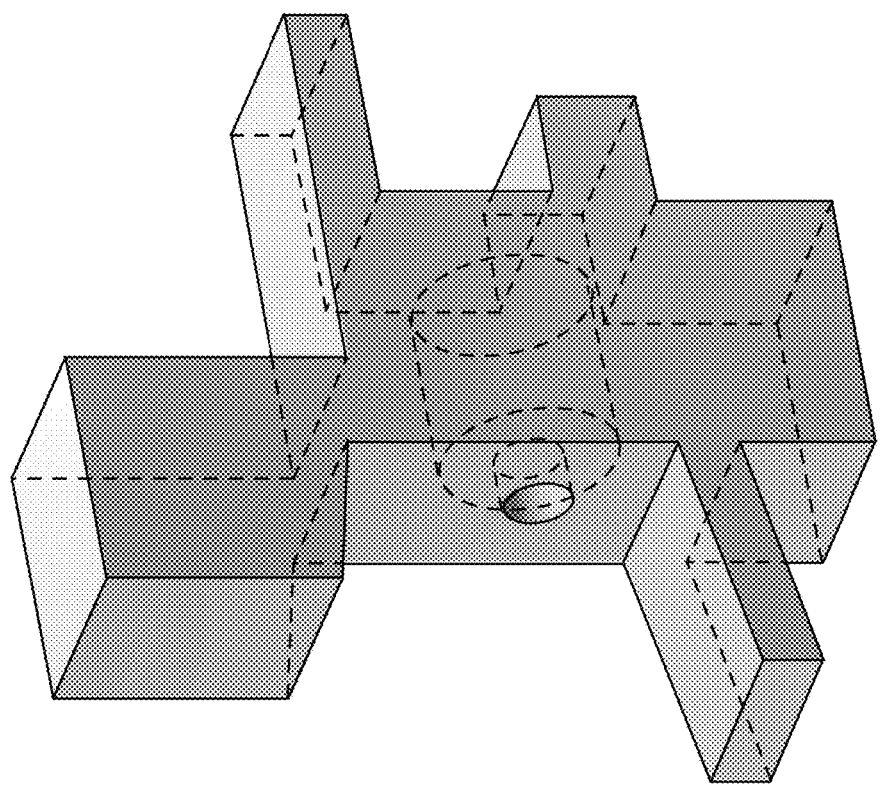

FIG. 8 shows a variation of a part printed as in FIG. 4. The part shown in FIG. 8 includes four overhanging or cantilevered sections OH2-OH5. Overhang OH2 is a lower, thicker overhang under a cantilevered, thinner overhang OH3. While the lower overhang OH2 may in some cases be printed without sintering supports or even green-body supports as a self-supporting cantilever, it is below the long cantilever overhang OH3, which is sufficiently long, thin, and heavy that it may require both green body supports and sintering supports. Overhang OH4 is a downward-leaning overhang, which must be printed with green body supports (because its lowest portion is otherwise unsupported, i.e., in free space, during printing) and in a form difficult to remove sintering supports printed beneath without drafting or parting lines (because rigid sintering supports would become locked in). Overhang OH5 is a cantilever including a heavy block of model material, which may require both green body and sintering support. In addition, the part shown in FIG. 8 includes an internal cylindrical volume, from which any necessary sintering supports must be removed via a small channel. For reference, the 3D shape of the part 14 of FIG. 8 is shown in FIGS. 12 and 13.

As shown in FIG. 8, in contrast to the sintering supports SS1 of FIGS. 4 and 6, sintering (e.g., shrinking) supports SS2, supporting overhangs OH2 and OH3, may be formed including thin walled, vertical members. The vertical members of sintering supports SS2 may be independent (e.g., vertical rods or plates) or interlocked (e.g., accordion or mesh structures). As shown in FIG. 8, the sintering supports SS2 (or indeed the sintering supports SS1 of FIGS. 4 and 6, or the sintering supports SS3, SS4, and SS5 of FIG. 8) may be directly tacked (e.g., contiguously printed in model material, but with relatively small cross-sectional area) to a raft RA2, to the part 14a, and/or to each other. Conversely, the sintering supports SS2 may be printed above, below, or beside a separation layer, without tacking. As shown, the sintering supports SS2 are removable from the orthogonal, concave surfaces of the part 14a.

Further, as shown in FIG. 8, similar sintering (e.g., shrinking) supports SS3 are printed beneath the downward-leaning overhang OH4, and beneath heavier overhang OH5. In order that these supports SS3, may be readily removed, some or all are printed with a parting line PL, e.g., formed from separation material, and/or formed from a mechanically weakened separation structure (e.g., printing with a nearly or barely abutting clearance as described herein, or printing with a wasp-waisted, pinched, or perforated cross-section, or the like), or a combination of these (or, optionally, a combination of one or both of these with green body support material having little or no ceramic or metal content, should this be separately printed). These material or mechanical separation structures, facilitating removal of the sintering supports, may be similarly printed into the various sintering supports shown in FIGS. 4-7, 9, and throughout.

In addition, as shown in FIG. 8, sintering (e.g., shrinking) supports SS5 are printed within the internal volume V2. The sintering supports SS5 are each provided with multiple parting lines, so that the sintering supports in this case can be broken or fall apart into parts sufficiently small to be readily removed, via the channel connecting the internal volume V2. As shown, the channel CH2 itself is not printed with internal supports, as an example of a small-diameter hole of sufficient rigidity during both printing and sintering to hold its shape. Of course, supports may be printed of either or both types to ensure shape retention.

Figure 9:
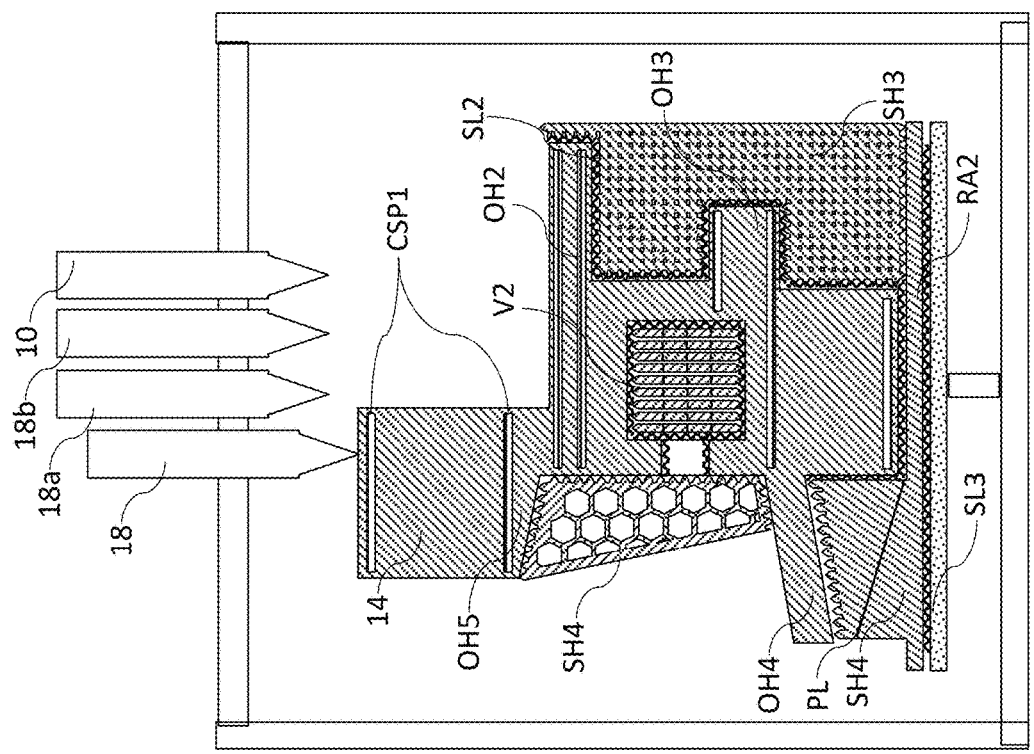
FIG. 9 is an schematic representation of an additional alternative 3D printing system, part, and process to that of FIG. 4.

FIG. 9 is substantially similar to FIG. 8, but shows some variations in structure. For example, beneath overhang OH3, a monolithic, form-fitting shell SH3 is printed of model material, separated from the part 14 by either release or separation layers SL2 and/or protrusions P1. The monolithic shell SH3 has small open cell holes throughout to lower weight, save material, and improve penetration or diffusion of gases or liquids for debinding. This shell SH3 may surround the part 14 if sufficient parting lines or release layers are printed into the shell SH3 (e.g., instead of the structures SH4 and SH5 to the left of the drawing, a similar structure would be arranged), and if sufficiently form following, act as a workholding piece.

In another example in FIG. 9, monolithic (e.g., lateral) support (e.g., shrinking) shell SH4 is printed integral with the raft RA2, but with a parting line PL angled to draft and permit removal of the support shell SH4. In a further example shown in FIG. 9, support shell SH4 is printed angled upward (to save material) and with a large cell or honeycomb interior to lower weight, save material, and/or improve penetration or diffusion of gases or liquids for debinding.

FIG. 9 also shows examples of continuous fiber layers deposited by, e.g., continuous fiber head 10. Sandwich-panel reinforcement layers CSP1 are positioned at various layers, e.g., within upper and lower bounds of overhangs OH2, OH3, and OH5.

As noted, in one example, green body supports may optionally be printed from a matrix of thermal, soluble, or catalytic debindable composite material (e.g., catalytic including Polyoxymethylene—POM/acetal) and high melting point metal (e.g., molybdenum) or ceramic spheres, and leave behind a powder when debound. In another example, green body supports are printed from a thermal, soluble, pyrolytic or catalytically responsive material (e.g., polymer or polymer blend) and leave behind only removable byproducts (gases or dissolved material) when the green body supports are removed. The green body supports may be formed to be mechanically or chemically or thermally removed before or after debinding, but preferably are also made from thermal, soluble, pyrolytic or catalytically responsive material, and may be fully removed during the debinding stage (or immediately thereafter, e.g., subsequent powder cleaning to remove remainder powder). In some cases, the green body supports are removed by a different chemical/thermal process from the debinding, before or after debinding.

An exemplary catalytically debindable composite material including POM or acetal is one example of a two-stage debinding material. In some cases, in a two-stage debinding material, in a first stage a first material is removed, leaving interconnected voids for gas passage during debinding. The first material may be melted out (e.g., wax), catalytically removed (e.g., converted directly into gas in a catalytic surface reaction), or dissolved (in a solvent). A second stage binder, e.g., polyethylene, that is not as responsive to the first material process, remains in a lattice-like and porous form, yet maintaining the shape of the 3D printed object awaiting sintering (e.g., before the metal or ceramic balls have been heated to sufficient temperature to begin the atomic diffusion of sintering). This results in a brown part, which includes, or is attached to, the sintering supports. As the part is sintered at high heat, the second stage binder may be pyrolised and progressively removed in gaseous form.

Sintering supports may be formed in blocks or segments with at least some intervening release layer material, so as to come apart during removal. Untacked sintering supports may be formed from the model material, i.e., the same composite material as the part, but separated from the part to be printed by a release layer, e.g., a higher temperature composite having the same or similar binding materials. For example, for most metal printing, the release layer may be formed from a high temperature ceramic composite with the same binding waxes, polymers, or other materials. The release layer may be very thin, e.g., one 3D printing layer. When the metal is sintered, the release layer—having already had a first stage binder removed—is essentially powderized as the temperature is insufficient to sinter or diffusion bond the ceramic material. This enables the untacked sintering supports to be easily removed after sintering.

Tacked sintering supports may be similarly formed from the model material, i.e., the same composite material as the part, but may connect to the part either by penetrating the release layer or without a release layer. The tacked sintering supports are printed to be contiguous with the part, via thin connections, i.e., "tacked" at least to the part. The tacked sintering supports may in the alternative, or in addition, be printed to be contiguous with a raft below the part which interconnects the part and the supports with model material. The raft may be separated from a build plate of a 3D printer by a layer or layers of release layer material.

A role of tacked and untacked of sintering supports is to provide sufficient supporting points versus gravity to prevent, or in some cases remediate, sagging or bowing of bridging, spanning, or overhanging part material due to gravity. The untacked and tacked sintering supports are both useful. Brown bodies, in the sintering process, may shrink by atomic diffusion uniformly about the center of mass or centroid of the part. In metal sintering and some ceramics, typically this is at least in part solid-state atomic diffusion. While there may be some cases where diffusion-based mass transport among the many interconnected metal/ceramic spheres does not transport sufficient material to, e.g., maintain a very thin bridge joining large masses, this is not necessarily the case with supports, which may be contiguously formed connected at only one end as a one-ended bridge (or connected at two ends as two-ended bridges; or interconnected over the length).

In those cases where tacked sintering supports are tacked to, or connected to, a model material raft upon which the part is printed, the interconnection of model material among the tacked sintering supports and the raft can be arranged such that the centroid of the raft-supports contiguous body is at or near the same point in space as that of the part, such that the part and the raft-support contiguous party each shrink during sintering uniformly and without relative movement that would move the supports excessively with respect to the part. In other cases, the part itself may also be tacked to the model material raft, such that the entire contiguous body shrinks about a common centroid. In another variation, the part is interconnected to the raft via tacked sintering supports tacked at both ends (e.g., to the raft and to the part) or and/along their length (e.g., to the part and/or to each other).

In other cases, untacked sintering supports may be confined within a volume and contiguous with the raft and/or the part, the volume formed from model material, such that they may shrink about their own centroids (or interconnected centroid) but are continually moved through space and kept in a position supporting the part by the surrounding model material. For example, this may be effective in the case of the internal volume V2 of FIG. 8 or 9.

In the alternative, or in addition, support or support structures or shells may be formed from model material following the form of the part in a lateral direction with respect to gravity, e.g., as shown in certain cases in FIGS. 4-9. The model material shells may be printed tacked to the base raft (which may be tacked to the part). They may be printed integral with, but separable from the base raft. The base raft may be separable together with the model material shells. These support structures may be offset from or substantially follow the lateral outer contours of the part, or may be formed from primitive shapes (straight or curved walls) but close to the part. In one variation, the support structures may envelop the part on all sides (in many cases, including parting lines and/or separation structures to permit the shell to be removed). These offset support structures may be printed with a separation layer or layers of the separation material (optionally ceramic or another material that will transfer mechanical support but will not be difficult to separate).

Any of the support structures discussed herein—e.g., tacked or untacked sintering supports, and/or support shells, may be printed with, instead of or in addition to intervening separation material, a separation clearance or gap (e.g., 5-100 microns) between the part and support structure (both being formed from model material). In this manner, individual particles or spheres of the support structure may intermittently contact the part during sintering, but as the separation clearance or gap is preserved in most locations, the support structures are not printed with compacted, intimate support with the part. When and if bonding diffusion occurs at intermittently contacting particles, the separation force required to remove the separation clearance support structures after sintering may be "snap-away" or "tap-away", and in any case far lower than an integral or contiguous extension of the part.

In an alternative, separation gaps or clearances between the part and support structures may be placed in partial segments following the contour, with some of the remainder of the support structures following the e.g., lateral contour of the part more closely or more distantly, or both. For example, support structures may be printed with a small separation gap (5-100 microns) for the majority of the support structure, but with other sections partially substantially following the contour printed yet closer to the part (e.g., 1-20 microns) providing increased rigidity and support during sintering, yet generally over a set of limited contact areas, permitting removal. This may also be carried out with large and medium gaps (e.g., 100-300 microns separation for the larger clearance support structures, optionally with separation material intervening, and 5-100 microns for the more closely following support structures). Further, this may be carried out in three or more levels (e.g., 100-300 micron gaps, 5-100 micron gaps, and 1-20 micron gaps in different portions of the support structures following the contour of the part).

Optionally, the sintering support structures may include a following shell with an inner surface generally offset from the e.g., lateral part contour by a larger (e.g., 5-300 microns) gap or clearance, but will have protrusions or raised ridges extending into the gap or clearance to and separated by the smaller gap (e.g., 1-20 microns), or extending across the gap or clearance, to enable small point contacts between the part and support structures formed from the same (or similar) model material. Point contacts may be easier to break off after sintering than compacted, intimate contact of, e.g., a following contour shell.

Optionally, a neat matrix (e.g., green body supports formed from one or more of the binder components) support structure may be printed between model material (e.g., metal) parts and model material (e.g., metal) support structures to maintain the shape of the part and structural integrity during the green and brown states, reducing the chance of cracking or destruction in handling.

Figure 10:
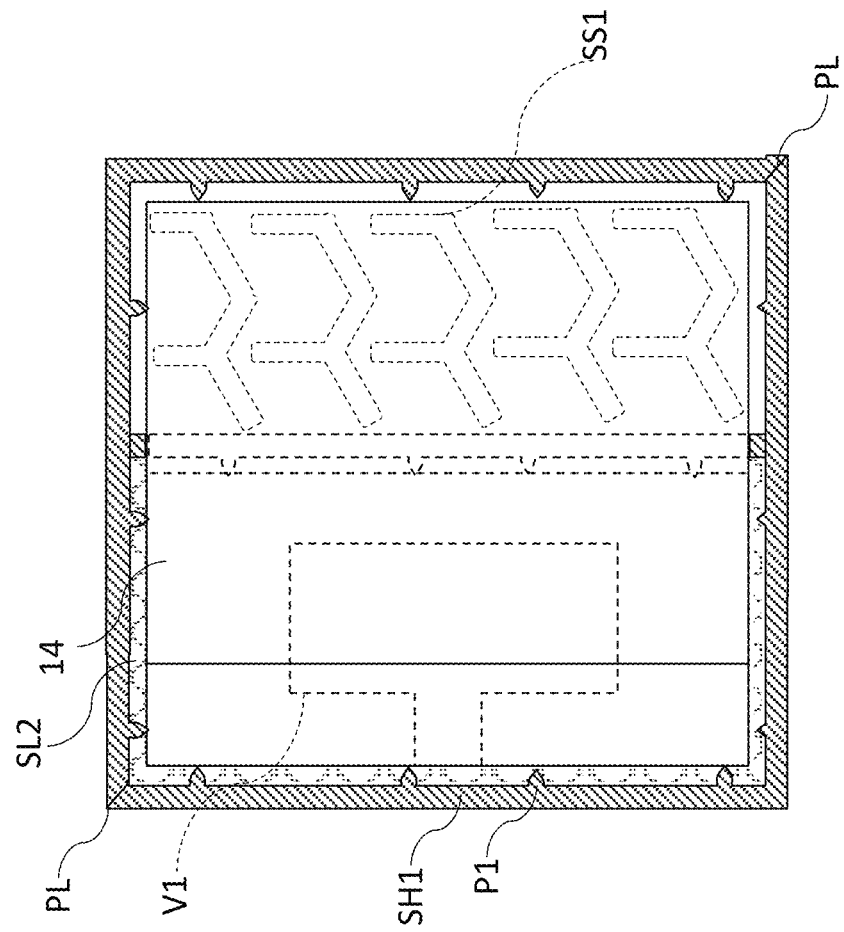
FIG. 10 is a top view of a sintered assembly of the 3D printing system, part, and process of FIG. 4, showing parting lines for removing support shells or sintering or shrinking supports.
Figure 11:
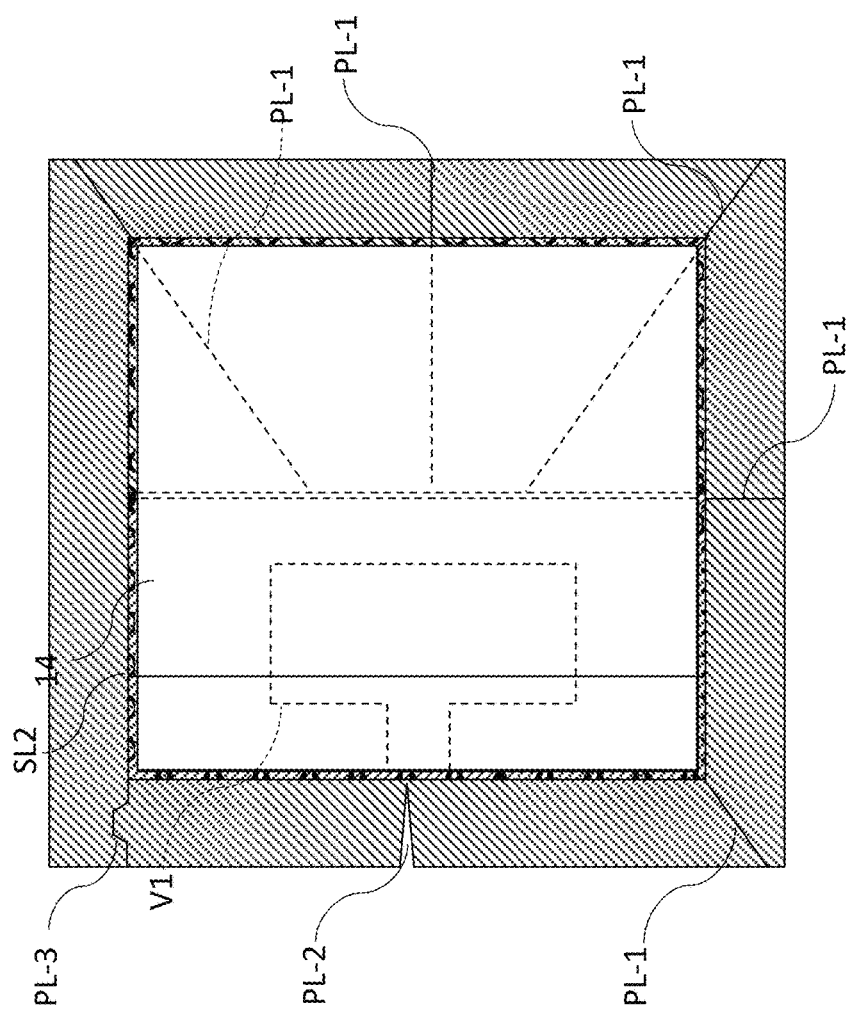
FIG. 11 is a top view of a sintered assembly of an alternative 3D printing system, part, and process to that of FIG. 4, showing parting lines for removing support shells or sintering or shrinking supports.

While several of the Figures are shown in side, cross section view, FIG. 10 shows the sintered body structure of FIG. 4 in top views, while FIG. 11 shows a variation for the purpose of explanation. As shown, support shells or other structures may be printed with separation or parting lines or layers between portions of the support structure. The separation or parting lines or layers may be any separation structure described herein, including those described between the part and support structure. For example, the separation lines or layer permitting a support shell to be broken into two or more parts (optionally many parts) may be formed from separation material (e.g., ceramic and binder), from binder material, from model material (e.g., metal) with separation gaps (such as 1-20, 5-100, or 50-300 microns) and/or protrusions or ridges permitting snap-off structures. For example, a support structure or shell may be formed to be split in two halves (e.g., as in FIG. 10), creating a parting line in the support structure or shell. Parting lines are optionally printed to be contiguous within a plane intersecting (e.g., bisecting) a support shell structure so as to permit ready separation. Multiple planes of parting lines may intersect the support shell structure.

In the case of complex geometries, as noted above, support structures may be printed with parting lines, sectioned into smaller subsections (e.g., as PL-1 in FIG. 11, like orange slices, or further sectioned in an orthogonal axis such that they can be easily removed), as shown in FIG. 11. For example, if support structures are printed filling in a dovetail of a part, support structures could be formed in three parts, e.g., could be designed in three parts, such that the center part either has draft or is rectangular and can be easily removed, thereby freeing up the two side parts to slide inward and then be removed. Conversely, parting lines may be printed to be interlocking (e.g., PL-3 in FIG. 11), crenellated or formed as a box joint (e.g., similar to PL-3 in FIG. 11), so as to resist separation, in some cases other than in a transverse direction. Parting lines may be printed nearly almost cut through the support shell (e.g., PL-2 in FIG. 11). Note that FIG. 11 is depicted without protrusions P1, i.e., with only separation layers SL2 in the vertical direction, and largely monolithic, surrounding support shell SH.

In some cases, particularly in the case of a small number of parting lines (e.g., halves, thirds, quarters) the support structures, at least because they are form following structures, may be preserved for later use as a workholding fixture, e.g., soft jaws, for holding a sintered the part in secondary operations (such as machining). For example, if a support structure were to support a generally spherical part, a support structure suitable for later use as a workholding jaw or soft jaw, the structure should retain the part from all sides, and therefore extend past the center or half-way point of the sphere. For the purposes of sintering and supporting vs. gravity, the support structure need not extend past the halfway point (or slightly before), but for the purposes of subsequent workholding for inspection and post processing, the support structure would continue past the half way point (e.g. up to ⅔ of the part's height, and in some cases overhanging the part) enabling positive grip in, e.g., a vise.

Further, attachment features to hold the workholding fixture(s) or soft jaw(s) in a vise (or other holder) may be added to the support structure for the purpose of post processing, e.g., through holes for attachment to a vise, or dovetails, or the like.

Alternatively, or in addition, a ceramic support may be printed, and sintered, to act as a reusable support for the sintering step of many 3D printed parts. In this case, upwardly facing surfaces of the reusable support may be printed to shrink to the same height as the matching or facing surface of the part being supported.

As discussed herein, a feedstock material for forming the part and/or the sintering supports may include approximately 50-70% (preferably approx. 60-65%) volume fraction secondary matrix material, e.g., (ceramic or metal) substantially spherical beads or powder in 10-50 micron diameter size, approximately 20-30% (preferably approx. 25% volume fraction of soluble or catalysable binder, (preferably solid at room temperature), approximately 5-10% (preferably approx. 7-9%) volume fraction of pyrolysable binder or primary matrix material, (preferably solid at room temperature), as well as approximately 0.1-15% (preferably approx. 5-10%) volume fraction of carbon fiber strands, each fiber strand coated with a metal that does not react with carbon at sintering temperatures or below (e.g., nickel, titanium boride). As discussed herein, the "primary matrix" is the polymer binder and is deposited by the 3D printer, holding the "secondary matrix" beads or spheres and the fiber filler; and following sintering, the (ceramic or metal) material of the beads or spheres becomes the matrix, holding the fiber filler.

Alternatively, a feedstock material for forming the part and/or the sintering supports may include approximately 50-70% (preferably approx. 60-65%) volume fraction secondary matrix material, e.g., (ceramic or metal) substantially spherical beads or powder in 10-50 micron diameter size, approximately 20-30% (preferably approx. 25% volume fraction of soluble or catalysable binder, (preferably solid at room temperature), approximately 5-10% (preferably approx. 7-9%) volume fraction of a pyrolysable binder or secondary matrix material approximately $\frac{1}{10}$-$\frac{1}{200}$ the elastic modulus of the (ceramic or metal) secondary matrix material, and approximately 0.1-15% (preferably approx. 5-10%) volume fraction of particle or fiber filler of a material approximately 2-10 times the elastic modulus of the secondary, (metal or ceramic) matrix material. As discussed herein, the "primary matrix" is the polymer binder and is deposited by the 3D printer, holding the "secondary matrix" beads or spheres and the fiber filler; and following sintering, the (ceramic or metal) material of the beads or spheres becomes the matrix, holding the particle of fiber filler.

A comparison of elastic modulus may be found in the following table, with polymer/binder primary matrices of 1-5 GPa elastic modulus

| Secondary matrix | Elastic Modulus ($10^9$ N/m$^2$, GPa) | Fill | Elastic Modulus ($10^9$ N/m$^2$, GPa) |
| --- | --- | --- | --- |
| Steel | 180-200 | Carbon Fiber | 200-600 |
| Aluminum | 69 | Graphite Fiber | 200-600 |
| Copper | 117 | Boron Nitride | 100-400 |
| Titanium | 110 | Boron Carbide | 450 |
| Alumina | 215 | Silicon Carbide | 450 |
| Cobalt | 209 | Alumina | 215 |
| Bronze | 96-120 | Diamond | 1220 |
| | | Tungsten Carbide | 450-650 |
| | | Graphene | 1000 |
| | | Carbon Nanotube | 1000+ |

The spheres, beads or powder (e.g., particulate) may be a range of sizes. A binder may include dispersant, stabilizer, plasticizer, and/or inter-molecular lubricant additive(s). Some candidate secondary matrix-filler combinations that may be deposited by a 3D printer within a binder or polymer primary matrix include cobalt or bronze beads with tungsten carbide coated graphite (carbon) fibers; aluminum beads with graphite (carbon) fibers; steel beads with boron nitride fibers; aluminum beads with boron carbide fibers; aluminum beads with nickel coated carbon fibers; alumina beads with carbon fibers; titanium beads with silicon carbide fibers; copper beads with aluminum oxide particles (and carbon fibers); copper-silver alloy beads with diamond particles. Those fibers that may be printed via the techniques of the CFF Patent Applications may also be embedded as continuous fibers. Carbon forms for particles or fibers include carbon nanotubes, carbon blacks, short/medium/long carbon fibers, graphite flakes, platelets, graphene, carbon onions, astralenes, etc.

Some soluble-pyrolysable binder combinations include polyethylene glycol (PEG) and polymethyl methacrylate (PMMA) (stearic acid optional, PMMA in emulsion form optional); waxes (carnauba, bees wax, paraffin) mixed with steatite and/or polyethylene (PE); PEG, polyvinylbutyral (PVB) and stearic acid.

Some pyrolysable second stage binders include: polyolefin resins polypropylene (PP), high-density polyethylene (HDPE); linear low-density polyethylene (LLDPE), and polyoxymethylene copolymer (POM). As noted, in thermal debinding, a part containing binder is heated at a given rate under controlled atmosphere. The binder decomposes by thermal cracking in small molecules that are sweep away by the gas leaving the oven. In solvent debinding, a part containing binder is subject to dissolving the binder in appropriate solvent, e.g., acetone or heptane. In catalytic debinding, the part is brought into contact with an atmosphere that contains a gaseous catalyst that accelerates cracking of the binder, which can be carried away.

Accordingly, the present disclosure describes a method of depositing material and an apparatus for additive manufacturing. The apparatus feeds a first filament including a binder matrix and sinterable spherized and/or powdered first material having a first sintering temperature along a material feed path, and feeds a second filament including the binder matrix and sinterable spherized and/or powdered second material having a second sintering temperature higher than the first sintering temperature (optionally, e.g., more than 500 degrees C. higher). The apparatus forms layers of second material by deposition upon a build plate or prior deposition of first or second material, and layers of first material by deposition upon prior deposition of second material. The apparatus (including an additional station of the apparatus) debinds at least a portion of the binder matrix from each of the first material and second material. The apparatus (including an additional station of the apparatus) then heats a part so formed from first and second material to the first sintering temperature, thereby sintering the first material and decomposing the second material. In printing a sinterable part using a 3D printing model material including a binder and a ceramic or metal sintering material, a release layer intervenes between support structures and the part, each of the support structures and the part formed of the model material or composite. The release layer includes a spherized or powdered higher melting temperature material—ceramic or high temperature metal for example, optionally deposited with a similar (primary) matrix or binder component to the model material. After sintering, the release layer may become a loose powder, permitting the supports to be easily removed.

In the present disclosure, "3D printer" is inclusive of both discrete printers and/or toolhead accessories to manufacturing machinery which carry out an additive manufacturing sub-process within a larger process. A 3D printer is controlled by a motion controller 20 which interprets dedicated G-code and drives various actuators of the 3D printer in accordance with the G-code.

"Fill material" includes material that may be deposited in substantially homogenous form as extrudate, fluid, or powder material, and is solidified, e.g., by hardening, crystallizing, or curing. "Substantially homogenous" includes powders, fluids, blends, dispersions, colloids, suspensions and mixtures.

"3D printer" meaning includes discrete printers and/or toolhead accessories to manufacturing machinery which carry out an additive manufacturing sub-process within a larger process. A 3D printer is controlled by a motion controller 20 which interprets dedicated G-code (toolpath instructions) and drives various actuators of the 3D printer in accordance with the G-code.

"Deposition head" may include jet nozzles, spray nozzles, extrusion nozzles, conduit nozzles, and/or hybrid nozzles.

"Filament" generally may refer to the entire cross-sectional area of a (e.g., spooled) build material.

What is claimed is:

1. A method of reducing distortion in an additively manufactured part, comprising:
   forming a shrinking platform of successive layers of a composite, the composite including a metal particulate filler in a first matrix;
   forming a shrinking support of successive layers of the composite upon the shrinking platform;
   forming a first release layer of a release material upon the shrinking support, the release material including a ceramic particulate and a second matrix; and
   forming a part of the composite upon the shrinking support to form a portable assembly from the combined shrinking platform, shrinking support, release layer and part that is configured to be transported, debound, and sintered as a unit, wherein substantially horizontal portions of the part are vertically supported by the shrinking platform, wherein the first release layer is configured, after sintering, to separate the part from the shrinking support and to allow the part to be readily removed from the shrinking support, and wherein the shrinking support is configured to prevent the part from distorting from gravitational force during sintering.

2. The method according to claim 1, further comprising:
   depositing an open cell structure in at least one of the shrinking platform, the shrinking support, and the part; and
   penetrating a fluid debinder into the open cell structure to debind at least one of the first matrix and the second matrix from within the open cell structure.

3. The method according to claim 1, wherein forming the first release layer comprises forming the first release layer to intervene at a non-horizontal surface of the part opposing a surface of the shrinking support, the non-horizontal surface of the part including at least one of a vertical surface, a curved surface, and a surface angled with respect to horizontal.

4. The method according to claim 1, wherein the first binder includes a first component and a second component, and further comprising:
   resisting, with the first component, deformation of the shape of the portable assembly during the simultaneous debinding of the first matrix and second matrix; and
   resisting, with the second component, deformation of the shape of the brown portable assembly caused by gravitational force.

5. The method according to claim 1, further comprising:
   forming a lateral support shell of the composite following a lateral contour of the part; and
   connecting the lateral support shell to the lateral contour of the part by forming separable attachment protrusions of the composite between the lateral support shell and the part.

6. The method according to claim 1, further comprising:
   forming soluble support structures that resist downward forces during the forming of the part; and
   dissolving the soluble support structures before heating the brown portable assembly.

7. The method according to claim 1, further comprising:
   forming soluble support structures of the release material that resist downward forces during the forming of the part; and
   debinding the second matrix to dissolve the second matrix of the soluble support structures and leave loose ceramic particulate before heating the brown portable assembly.

8. The method according to claim 1, further comprising:
   providing a sliding powder layer below the shrinking platform, of equal or larger surface area than a bottom of the shrinking platform, that reduces lateral resistance between the shrinking platform and an underlying surface;
   simultaneously, and in a same chamber, debinding a component of the first matrix and of the second matrix in the portable assembly to form a brown portable assembly; and
   heating the brown portable assembly to shrink all of the shrinking platform, the shrinking support, and the part together at a same rate as neighboring metal particles throughout the shape-retaining brown part assembly undergo atomic diffusion.

9. The method according to claim 8, wherein the underlying surface comprises a portable build plate, wherein forming the shrinking platform comprises forming the shrinking platform above the portable build plate, wherein providing the sliding powder layer comprises forming the sliding powder layer below the shrinking platform and above the portable build plate with the release material, and wherein the method further comprises:
   keeping the portable assembly together as a unit during the debinding;
   sintering the brown portable assembly during the heating; and
   keeping the brown portable assembly together during sintering, and after sintering, separating the build plate, sliding powder layer, shrinking platform, first release layer and shrinking support from the part.

10. The method according to claim 8, further comprising:
    powderizing the first release layer during the heating to leave loose ceramic powder between the opposing surfaces.

11. The method according to claim 1, wherein forming the shrinking platform comprises forming the shrinking platform to form a foundation for the shrinking support, all portions of the part configured to commonly shrink from lateral positions located to be supported by the foundation of the shrinking platform, and wherein the shrinking platform is configured to hold the part and the shrinking support in relative position during shrinking of the same composite and to prevent movement of the shrinking support versus the part that tends to distort the part.

12. The method according to claim 11, further comprising:
forming an interior support structure of the composite in a location supported by the part; and
forming a second release layer of the release material intervening between the part and the interior support structure, wherein the second support structure is configured to be displaced through space while continuously supported by the part during shrinking of the brown portable assembly, and the second release layer is configured to powderize during the heating to leave a loose powder that allows the interior support structure to be readily removed from the part after sintering.

13. The method according to claim 12, further comprising:
forming a third release layer of the release material intervening between a surface of the part and a top surface of the shrinking platform; and
forming a lowermost portion of the part from successive layers of the composite directly upon the third release layer and directly opposing the top surface of the shrinking platform.

14. The method according to claim 11, further comprising:
interconnecting the composite of the shrinking platform to the composite of the shrinking support to permit mass diffusion between neighboring metal particles found in the shrinking platform adjacent metal particles found in the shrinking support, to unitarily shrink the shrinking platform and the shrinking support.

15. The method according to claim 1, wherein the metal particulate filler includes metal particles distributed in a range of sizes.

16. A method of reducing distortion in an additively manufactured part; comprising:
depositing a shrinking platform of successive layers of a composite, the composite including a metal particulate filler in a first matrix;
depositing a plurality of shrinking supports of successive layers of the composite upon the shrinking platform;
interconnecting the composite of the shrinking platform to the plurality of shrinking supports to permit mass diffusion between neighboring metal particles found in the shrinking platform that are adjacent to metal particles found in the plurality of shrinking supports, to unitarily shrink the shrinking platform and plurality of shrinking supports and providing a continuous foundation for the plurality of shrinking supports;
depositing a first release layer of a release material upon the plurality of shrinking supports, the release material including a ceramic powder and a second matrix;
depositing a part of the composite upon the plurality of shrinking supports;
depositing a portable assembly from the combined shrinking platform, the plurality of shrinking supports, release layer and part;
debinding the first matrix and second matrix within the portable assembly simultaneously and in a same chamber to form a brown portable assembly; and
heating the brown portable assembly to a temperature sufficient to simultaneously sinter and shrink all of the shrinking platform, the plurality of shrinking supports, and the part together at a uniform rate as neighboring metal particles undergo mass diffusion, and to powderize the first release layer to leave loose ceramic powder between opposing surfaces, wherein the loose ceramic powder separates the part from the plurality of shrinking supports and allows the part to be readily removed from the plurality of shrinking supports after sintering.

17. The method according to claim 16, further comprising:
depositing an open cell structure in at least one of the shrinking platform, the plurality of shrinking supports, and the part; and
penetrating a fluid debinder into the open cell structure to debind the matrix from within the open cell structure.

18. The method according to claim 16, wherein depositing the first release layer comprises forming the first release layer to intervene at a non-horizontal surface of the part opposing a surface of the plurality of shrinking supports, the non-horizontal surface of the part including at least one of a vertical surface, a curved surface, and a surface angled with respect to horizontal.

19. The method according to claim 16, wherein the first binder includes a first component and a second component, and wherein the method further comprises:
resisting, with the first component, deformation of the shape of the portable assembly during the simultaneous debinding of the first matrix and second matrix; and
resisting, with the second component, deformation of the shape of the brown portable assembly caused by gravitational force.

20. The method according to claim 16, further comprising:
forming a lateral support shell of the composite following a lateral contour of the part; and
connecting the lateral support shell to the lateral contour of the part by forming separable attachment protrusions of the composite between the lateral support shell and the part.

21. The method according to claim 16, further comprising:
forming soluble support structures that resist downward forces during the depositing of the part; and
dissolving the soluble support structures before heating the brown portable assembly.

22. The method according to claim 16, further comprising:
forming soluble support structures of the release material that resist downward forces during the depositing of the part; and
debinding the second matrix to dissolve the second matrix of the soluble support structures and leave loose ceramic particulate before heating the brown portable assembly.

23. The method according to claim 16, further comprising:
providing a sliding powder layer below the shrinking platform, of equal or larger surface area than a bottom of the shrinking platform, that reduces lateral resistance between the shrinking platform and an underlying surface;
transporting the portable assembly together as a unit from a printer to a first location for the debinding; and
following debinding, transporting the brown portable assembly together from the first location to a second location for sintering; and
sintering the brown portable assembly at the second location during the heating.

24. The method according to claim 23, wherein the underlying surface comprises a portable build plate, wherein depositing the shrinking platform comprises forming the shrinking platform above the portable build plate, wherein providing the sliding powder layer comprises forming the sliding powder layer below the shrinking platform and above the portable build plate with the release material, wherein transporting the portable assembly comprises transporting the portable assembly together with the build plate as the unit from the printer to the first location for the debinding, wherein transporting the brown portable assembly comprises, following debinding, transporting the brown portable assembly together with the build plate from the first location to the second location for sintering, and wherein the method further comprises, following sintering, separating the build plate, sliding powder layer, shrinking platform, first release layer and the plurality of shrinking supports from the part.

25. The method according to claim 23, further comprising:
powderizing the first release layer during the heating to leave loose ceramic powder between the opposing surfaces.

26. The method according to claim 16, wherein depositing the shrinking platform comprises forming the shrinking platform to be laterally larger than the part, and wherein the shrinking platform holds the part and the support structure in relative position during shrinking of the composite and prevents movement of the support structure versus the part that tends to distort the part.

27. The method according to claim 16, further comprising:
forming an interior support structure of the composite in a location supported by the part; and
forming a second release layer of the release material intervening between the part and the interior support structure, wherein the interior support structure is displaced through space while continuously supported by the part during shrinking of the brown portable assembly, and the second release layer powderizes during the heating to leave a loose powder that allows the interior support structure to be readily removed from the part after sintering.

28. The method according to claim 16, further comprising:
forming a third release layer of the release material intervening between a surface of the part and a top surface of the shrinking platform; and
forming a lowermost portion of the part from successive layers of the composite directly upon the third release layer and directly opposing the top surface of the shrinking platform.

29. The method according to claim 16, wherein the metal particulate filler includes metal particles distributed in a range of sizes.

30. The method according to claim 16, wherein the composite including the metal composite material is deposited by one of fused deposition modeling or binder jetting.

* * * * *